(12) United States Patent
Manevich et al.

(10) Patent No.: US 11,736,456 B2
(45) Date of Patent: Aug. 22, 2023

(54) CONSENSUS SERVICE FOR BLOCKCHAIN NETWORKS

(71) Applicant: International Business Machines Corporation, Armonk, NY (US)

(72) Inventors: Yacov Manevich, Beer Sheva (IL); Jason Karl Yellick, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 17/035,814

(22) Filed: Sep. 29, 2020

(65) Prior Publication Data

US 2022/0103532 A1    Mar. 31, 2022

(51) Int. Cl.
*H04L 9/40*    (2022.01)
*G06F 16/27*    (2019.01)

(52) U.S. Cl.
CPC .......... *H04L 63/0435* (2013.01); *G06F 16/27* (2019.01)

(58) Field of Classification Search
CPC ... H04L 63/0435; H04L 9/085; H04L 9/3297; H04L 63/061; H04L 9/50; G06F 16/27
See application file for complete search history.

(56) References Cited

U.S. PATENT DOCUMENTS

| | | | | |
|---|---|---|---|---|
| 10,701,046 B1* | 6/2020 | Kaliski, Jr. | ........... | H04L 9/0861 |
| 11,082,220 B1* | 8/2021 | Saad | ...................... | H04L 9/0894 |
| 11,418,329 B1* | 8/2022 | Miller | ....................... | H04L 9/14 |
| 11,496,327 B1* | 11/2022 | Kaplan | ..................... | H04L 9/50 |
| 11,509,459 B2* | 11/2022 | Xu | ......................... | H04L 9/0618 |
| 2017/0019251 A1* | 1/2017 | Jain | ........................... | H04L 9/12 |
| 2018/0013832 A1* | 1/2018 | Lee | ...................... | H04L 63/0846 |
| 2019/0079950 A1 | 3/2019 | Ramabaja | | |

(Continued)

FOREIGN PATENT DOCUMENTS

| | | |
|---|---|---|
| CN | 106775497 A | 5/2017 |
| CN | 107438061 B | 12/2017 |

(Continued)

OTHER PUBLICATIONS

"Apache Kafka," IBM Cloud Education, Feb. 2020, 4 pages, https://www.ibm.com/cloud/learn/apache-kafka.

(Continued)

*Primary Examiner* — Mohammed Waliullah
(74) *Attorney, Agent, or Firm* — Grant Johnson

(57) ABSTRACT

A computer-implemented method for establishing consensus in a blockchain network, a total ordering service for a blockchain network, and a computer program product. One embodiment may comprise providing a first total ordering service (TOS) gateway for an organization in a blockchain network, generating a symmetric key at the first TOS gateway, splitting the symmetric key to generate a plurality of key shares, and distributing at least one of the plurality of key shares to a second TOS gateway in the blockchain network. The TOS gateway in some embodiments may have read/write access to a shared message queue that makes messages available to each other TOS gateway in the blockchain network. Some embodiments may further comprise recovering the symmetric key by requesting one of the key shares from the second gateway in the blockchain network, and reconstructing the symmetric key using the one of the key shares.

17 Claims, 24 Drawing Sheets

(56) References Cited

U.S. PATENT DOCUMENTS

| | | | |
|---|---|---|---|
| 2019/0253245 A1 | 8/2019 | Zhang et al. | |
| 2019/0356469 A1 | 11/2019 | Deshpande et al. | |
| 2019/0356470 A1 | 11/2019 | Deshpande et al. | |
| 2020/0358600 A1* | 11/2020 | Xu | H04L 9/3239 |
| 2021/0266149 A1* | 8/2021 | Bunch | H04L 9/0822 |
| 2022/0103532 A1* | 3/2022 | Manevich | H04L 9/085 |
| 2022/0103533 A1* | 3/2022 | Srinivasan | H04L 65/65 |
| 2022/0182235 A1* | 6/2022 | Tysor | G06F 16/90335 |

FOREIGN PATENT DOCUMENTS

| | | | |
|---|---|---|---|
| CN | 108876370 A | 11/2018 | |
| CN | 109413202 A | 3/2019 | |
| CN | 109803004 A | 5/2019 | |
| CN | 111445328 A | 7/2020 | |
| EP | 3654578 A1 | 5/2020 | |
| JP | 2008199206 A * | 8/2008 | |
| WO | WO-2015089171 A1 * | 6/2015 | G06F 21/10 |
| WO | WO-2018060754 A1 * | 4/2018 | H04L 9/0844 |
| WO | WO-2019067986 A1 * | 4/2019 | B60G 9/02 |
| WO | WO-2020055384 A1 * | 3/2020 | G06Q 20/32 |
| WO | 2022068318 A1 | 4/2022 | |

OTHER PUBLICATIONS

"IBM Event Streams, Apache Kafka for the Enterprise," IBM Cloud, Printed Aug. 17, 2020, 7 pages, https://www.ibm.com/cloud/event-streams.

"Introduction | Vault by HashiCorp," HashiCorp, Printed Aug. 18, 2020, 2 pages, https://www.vaultproject.io/docs/what-is-vault.

Mell et al., "The NIST Definition of Cloud Computing," Recommendations of the National Institute of Standards and Technology, U.S. Department of Commerce, Special Publication 800-145, Sep. 2011, 7 pages.

"Manage Secrets and Protect Sensitive Data," HashiCorp, Printed Sep. 28, 2020, 1 page, https://www.hashicorp.com/products/vault/.

P. Zhong, Q. Zhong, H. Mi, S. Zhang and Y. Xiang, "Privacy-Protected Blockchain System," 2019 20th IEEE International Conference on Mobile Data Management (MDM), 2019, pp. 457-461, doi: 10.1109/MDM.2019.000-2.

PCT/CN2021/106480, International Search Report and Written Opinion, dated Oct. 18, 2021.

Patents Act 1977: Examination Report under Section 18(3), Application No. GB2305433.1, dated Jun. 9, 2023, 7 pages.

* cited by examiner

CONSENSUS SERVICE FOR BLOCKCHAIN NETWORKS

BACKGROUND

The present disclosure relates to finalizing and committing transactions, and more specifically, to enabling consensus in decentralized, distributed transaction processing systems.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

One area where computing systems have been successfully applied is transaction processing. Historically, a centralized database stores and maintains transaction data in special-purpose database programs executing on one physical system at one location. This location is often a central computer, for example, a server computer or a mainframe computer. Centralized databases are relatively easy to maintain and manage, especially for purposes of security, because of their single point of control.

SUMMARY

According to embodiments of the present disclosure, a computer-implemented method for establishing consensus in a blockchain network. One embodiment may comprise providing a first total ordering service (TOS) gateway for an organization in a blockchain network, generating a symmetric key at the first TOS gateway, splitting the symmetric key to generate a plurality of key shares, and distributing at least one of the plurality of key shares to a second TOS gateway in the blockchain network. The TOS gateway in some embodiments may have read/write access to a shared message queue that makes messages available to each other TOS gateway in the blockchain network. Some embodiments may further comprise recovering the symmetric key by requesting one of the key shares from the second gateway in the blockchain network, and reconstructing the symmetric key using the one of the key shares.

According to embodiments of the present disclosure, a computer program product for a confidential ordering service comprising one or more computer readable storage media, and program instructions collectively stored on the one or more computer readable storage media. The program instructions may comprise program instructions for running a total ordering service gateway for each organization in a blockchain network, wherein each total ordering service gateway has read/write access to a shared message queue that distributes messages to each organization, identifying a group of organizations within the organizations, and generating a channel that includes the group of organizations, wherein the group of organizations cooperate autonomously. The program instructions may further comprise program instructions for generating a symmetric key only known to the group of organizations, splitting the symmetric key into respective shares associated with a number of organizations in the group of organizations, and storing the shares while not storing the symmetric key as a whole.

According to embodiments of the present disclosure, a total ordering service for a blockchain network. One embodiment may comprise a plurality of total ordering service (TOS) gateways, each associated with one of a plurality of member organizations in a blockchain network, and a shared message queue adapted redistribute the symmetric key to the plurality of TOS gateways in the blockchain network. The plurality of TOS gateways may each comprise a processor operably connected to a memory, the memory containing program instructions to, when executed on the processor, generate a symmetric key at a first of the plurality of TOS gateways, split the symmetric key into a plurality of key shares, and distribute at least one of the plurality of key shares to a second TOS gateway in the blockchain network.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
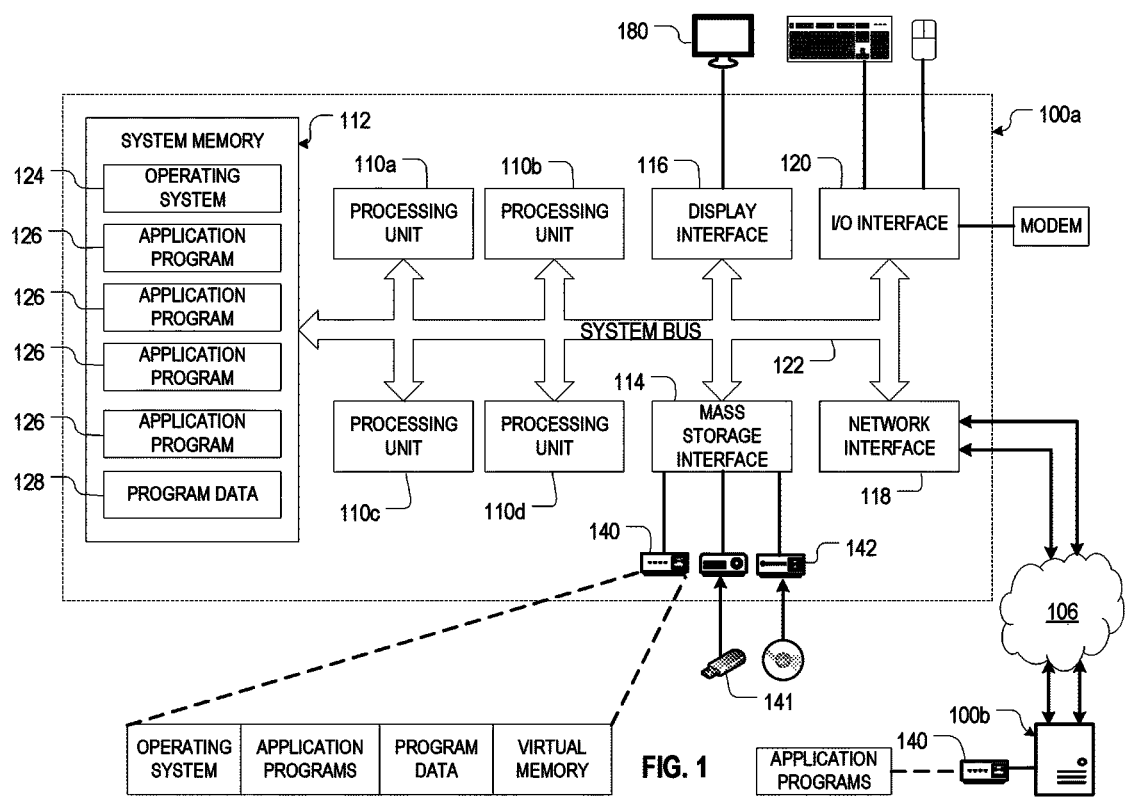
FIG. 1 depicts a data processing system, consistent with some embodiments.

While the invention is amenable to various modifications and alternative forms, specifics thereof have been shown by way of example in the drawings and may be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to finalizing and committing transactions; more particular aspects relate to enabling consensus in decentralized, distributed transaction processing systems. While the present disclosure is not necessarily limited to such applications, various aspects of the disclosure may be appreciated through a discussion of various examples using this context.

A decentralized database generally refers to a distributed storage system in which multiple nodes cooperate to store and/or provide access to the data. A blockchain is an example of a decentralized database, which generally includes an append-only immutable data structure resembling a distributed ledger capable of maintaining records between mutually not trusted/untrusted parties. These mutually not-trusted/untrusted parties are referred to herein as peers or peer nodes.

In some blockchain embodiments, each peer maintains a copy of the distributed database records and no single peer can modify the distributed database records without a consensus being reached among the peers. In some blockchain embodiments, the peers may execute a consensus protocol to validate blockchain transactions, to group the blockchain transactions into blocks, and to build a hash chain over the blocks. This process may form a distributed ledger by ordering the storage transactions for consistency.

In public, or permission-less, blockchain embodiments, anyone can participate without specific authorization. Permissioned blockchain embodiments, in contrast, provide a system that can secure inter-actions among a group of authorized entities that share a common goal, but which still do not fully trust one another, such as businesses that exchange funds, goods, information, and the like.

Some blockchain embodiments may operate arbitrary, programmable logic, tailored to a decentralized storage scheme, such as "smart contracts" and "chaincodes." In some of these embodiments, specialized chaincodes may exist for management functions and parameters, which are referred to as system chaincodes. Smart contracts are trusted distributed applications that leverage the tamper-proof properties of the blockchain and an underlying agreement between nodes (often referred to as an endorsement or endorsement policy).

Blockchain transactions in some embodiments may be "endorsed" before being committed to the blockchain, while transactions that are not "endorsed" may be disregarded. An endorsement policy consistent with some embodiments allows chaincode to specify endorsers for a transaction in the form of a set of peer nodes that are necessary for endorsement. When a client sends the transaction to the peers specified in the endorsement policy, the transaction may be executed to validate the transaction. After validation, the transactions may enter an ordering phase in which a consensus protocol is used to produce an ordered sequence of endorsed transactions grouped into blocks.

In some blockchain embodiments, nodes may act as the communication entities of the blockchain system. A "node" in these embodiments may perform a logical function in the sense that multiple nodes of different types can run on the same physical server. Nodes may be grouped in trust domains and may be associated with logical entities that control them in various ways. Nodes may also include different types, such as a client or submitting-client node, which submits a transaction-invocation to an endorser (e.g., peer), and ordering nodes, which broadcasts transaction-proposals to an ordering service. Yet another type of node is a peer node which can receive client submitted transactions, commit the transactions, and maintain a state and a copy of the ledger of blockchain transactions. Peer nodes in some embodiments may also have the role of an endorser, although it is not a requirement.

The ordering-service-node (or "orderer") in some embodiments may run the communication service for all nodes, and implement a delivery guarantee, such as a broadcast to each of the peer nodes in the system when committing transactions and modifying a world state of the blockchain. In some embodiments, this world state may include the initial blockchain transaction, which normally comprises control and setup information.

Some users of blockchain technology, however, may be reluctant to host ordering nodes. This may be because exposing an endpoint to the public internet has an innate security risk, and many users lack the technical expertise, focus, and resources required to manage that risk. Additionally, leader-based consensus protocols without rotation can lead to uneven network bandwidth distribution. This, in turn, may result in some users spending compute, disk I/O, network bandwidth on transactions that do not involve them. Still other users may worry about compliance with regulation, service level agreements, etc., particularly if a particular blockchain implementation does not include financial incentives to run ordering nodes.

Conversely, challenges may also exist in forming blockchain networks where the consensus service are hosted by a third party (e.g., someone not a party to a significant percentage of transactions recorded on the blockchain). For example, if the ordering service is run by a third party, that third party may have access to the blockchain content because the ordering service essentially creates the blocks themselves and because newly brought nodes need to parse the blocks in order to catch up with the state of the blockchain. This, however, may have unwanted side effects, such as: (i) the third party may be able to see all transactions of all channels in the clear (e.g., unencrypted), and hence, may have access to confidential and/or sensitive information; (ii) the parties of the blockchain network may need cooperation from the third party ordering service if they wish to migrate to a new ordering service provider, but because this is a non-trivial task, it raises a risk of eternal vendor lock-in.

Accordingly, some embodiments of the disclosure may enable the creation of blockchain networks even for syndicates of organizations that cannot host ordering service nodes. These blockchain networks may include a confidential total ordering service (TOS), which may receive and retransmit encrypted transaction payloads from a plurality of total ordering service gateways (TOS gateways) in some embodiments.

Data Processing System

FIG. 1 illustrates an embodiment of a data processing system (DPS) 100a, consistent with some embodiments. The DPS 100a in this embodiment may be implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 1 may be present, and that the number, type, and configuration of such components may vary. Moreover, FIG. 1 only depicts the representative major components of the DPS 100a, and individual components may have greater complexity than represented in FIG. 1.

The data processing system 100a in FIG. 1 comprises a plurality of central processing units 110a-110d (herein generically referred to as a processor 110 or a CPU 110) connected to a memory 112, a mass storage interface 114, a terminal/display interface 116, a network interface 118, and an input/output ("I/O") interface 120 by a system bus 122. The mass storage interface 114 in this embodiment connect the system bus 122 to one or more mass storage devices, such as a direct access storage device 140, universal serial bus ("USB") storage device 141, or a readable/writable optical disk drive 142. The network interfaces 118 allow the DPS 100a to communicate with other DPS 100b over the communications medium 106. The memory 112 also contains an operating system 124, a plurality of application programs 126, and program data 128.

Figure 3:
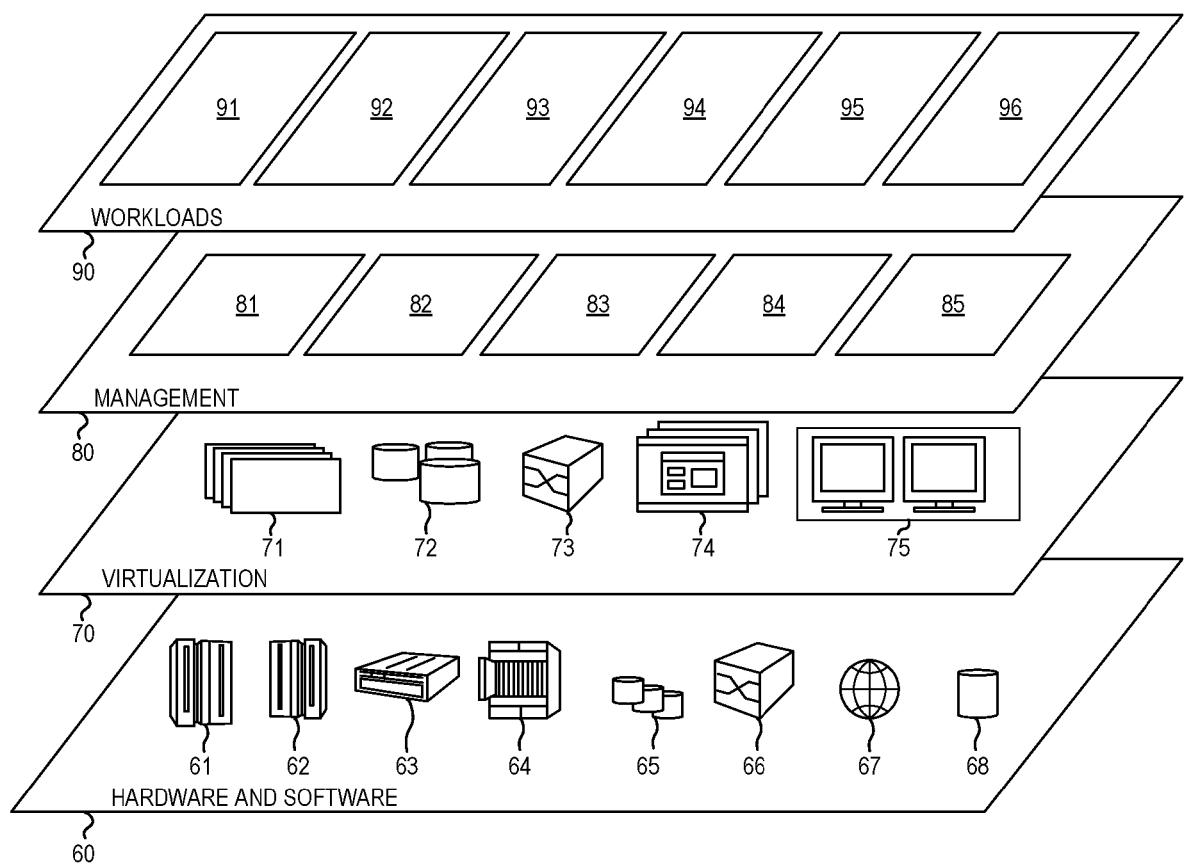
FIG. 3 depicts abstraction model layers, consistent with some embodiments.

The data processing system 100a embodiment in FIG. 3 is a general-purpose computing device. Accordingly, the processors 110 may be any device capable of executing program instructions stored in the memory 112 and may themselves be constructed from one or more microprocessors and/or integrated circuits. In this embodiment, the DPS 100a contains multiple processors and/or processing cores, as is typical of larger, more capable computer systems; however, in other embodiments the computing systems 100a may comprise a single processor system and/or a single processor designed to emulate a multiprocessor system. Further, the processors 110 may be implemented using a number of heterogeneous data processing systems 100a in which a main processor is present with secondary processors on a single chip. As another illustrative example, the processor 110 may be a symmetric multi-processor system containing multiple processors of the same type.

When the data processing system 100a starts up, the associated processor(s) 110 initially execute the program instructions that make up the operating system 124, which manages the physical and logical resources of the DPS 100a. These resources include the memory 112, the mass storage interface 114, the terminal/display interface 116, the network interface 118, and the system bus 122. As with the processor(s) 110, some DPS 100a embodiments may utilize multiple system interfaces 114, 116, 118, 120, and busses 122, which in turn, may each include their own separate, fully programmed microprocessors.

Instructions for the operating system, applications and/or programs (generically referred to as "program code," "computer usable program code," or "computer readable program code") may be initially located in the mass storage devices 140, 141, 142, which are in communication with the processors 110 through the system bus 122. The program code in the different embodiments may be embodied on different physical or tangible computer readable media, such as the system memory 112 or the mass storage devices 140, 141, 142. In the illustrative example in FIG. 3, the instructions are stored in a functional form of persistent storage on the direct access storage device 140. These instructions are then loaded into the memory 112 for execution by the processor 110. However, the program code may also be located in a functional form on the computer readable media 142 that is selectively removable and may be loaded onto or transferred to the DPS 100a for execution by the processor 110.

The system bus 122 may be any device that facilitates communication between and among the processors 110; the memory 112; and the interfaces 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The memory 112 and the mass storage devices 140, 141, 142 work cooperatively to store the operating system 124, the application programs 126, and the program data 128. In this embodiment, the memory 112 is a random-access semiconductor device capable of storing data and programs. Although FIG. 3 conceptually depicts that device as a single monolithic entity, the memory 112 in some embodiments may be a more complex arrangement, such as a hierarchy of caches and other memory devices. For example, the memory 112 may exist in multiple levels of caches, and these caches may be further divided by function, so that one cache holds instructions while another holds non-instruction data, which is used by the processor or processors. Memory 112 may be further distributed and associated with different processors 110 or sets of processors 110, as is known in any of various so-called non-uniform memory access (NUMA) computer architectures. Moreover, some embodiments may utilize virtual addressing mechanisms that allow the DPS 100a to behave as if it has access to a large, single storage entity instead of access to multiple, smaller storage entities such as the memory 112 and the mass storage device 140, 141, 142.

Although the operating system 124, the application programs 126, and the program data 128 are illustrated as being contained within the memory 112, some or all of them may be physically located on different computer systems and may be accessed remotely, e.g., via the communications medium 106, in some embodiments. Thus, while the operating system 124, the application programs 126, and the program data 128 are illustrated as being contained within the memory 112, these elements are not necessarily all completely contained in the same physical device at the same time and may even reside in the virtual memory of other DPS 100b.

The system interfaces 114, 116, 118, 120 support communication with a variety of storage and I/O devices. The mass storage interface 114 supports the attachment of one or more mass storage devices 140, 141, 142, which are typically rotating magnetic disk drive storage devices, a solid-state storage device (SSD) that uses integrated circuit assemblies as memory to store data persistently, typically using flash memory, or a combination of the two. However, the mass storage devices 140, 141, 142 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 116 is used to directly connect one or more display units, such as monitor 180, to the data processing system 100a. These display units 180 may be non-intelligent (i.e., dumb) terminals, such as an LED monitor, or may themselves be fully programmable workstations used to allow IT administrators and customers to communicate with the DPS 100a. Note, however, that while the display interface 116 is provided to support communication with one or more display units 180, the computer systems 100a does not necessarily require a display unit 180 because all needed interaction with customers and other processes may occur via network interface 118.

The communications medium 106 may be any suitable network or combination of networks and may support any appropriate protocol suitable for communication of data and/or code to/from multiple DPS 100a, 100b. Accordingly, the network interfaces 118 can be any device that facilitates such communication, regardless of whether the network connection is made using present day analog and/or digital techniques or via some networking mechanism of the future. Suitable communication media 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 106. The Transmission Control Protocol/Internet Protocol ("TCP/IP") suite contains suitable network and transport protocols.

Cloud Computing

Figure 2:
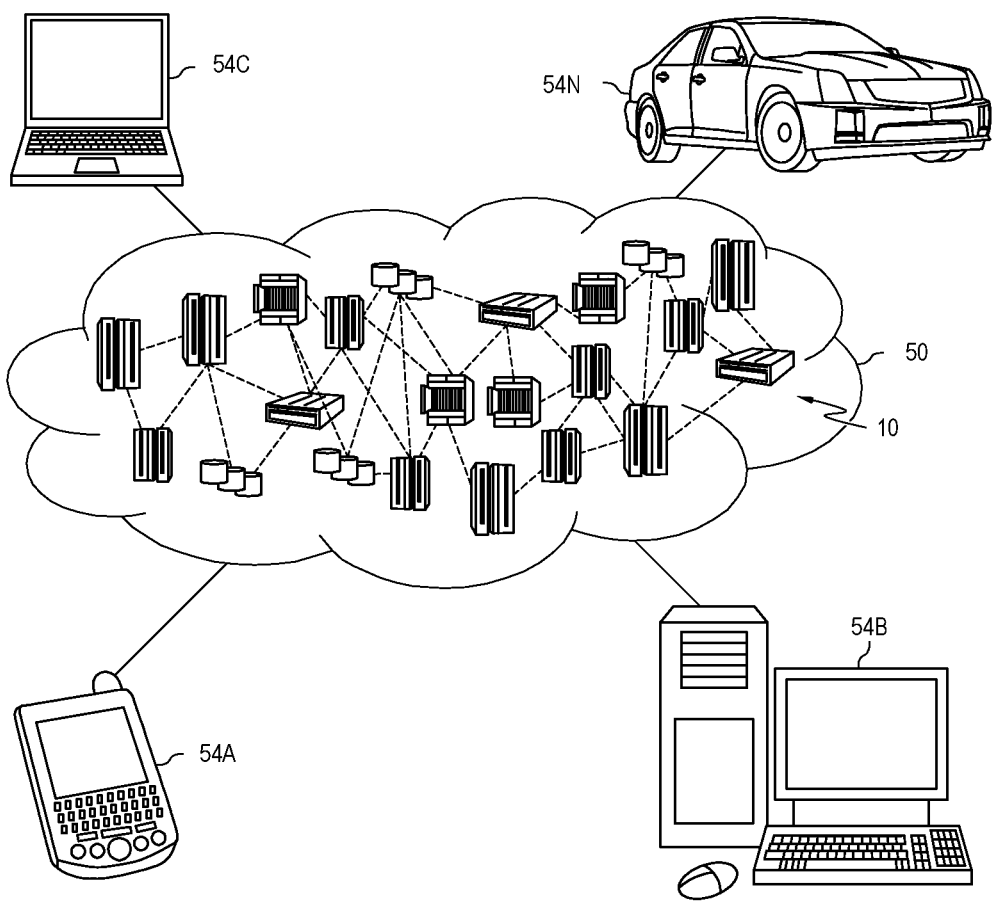
FIG. 2 depicts a cloud computing environment, consistent with some embodiments.

FIG. 2 illustrates a cloud environment containing one or more DPS 100a, consistent with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active customer accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited customer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations).

It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. are intended to be illustrative only and that computing nodes 10 and cloud computing environment 50 can communicate with any type of computerized device over any type of network and/or network addressable connection (e.g., using a web browser).

Referring now to FIG. 3, a set of functional abstraction layers provided by cloud computing environment 50 (FIG. 2) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. Customer portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an ordering service 96.

Blockchain System

Figure 4:
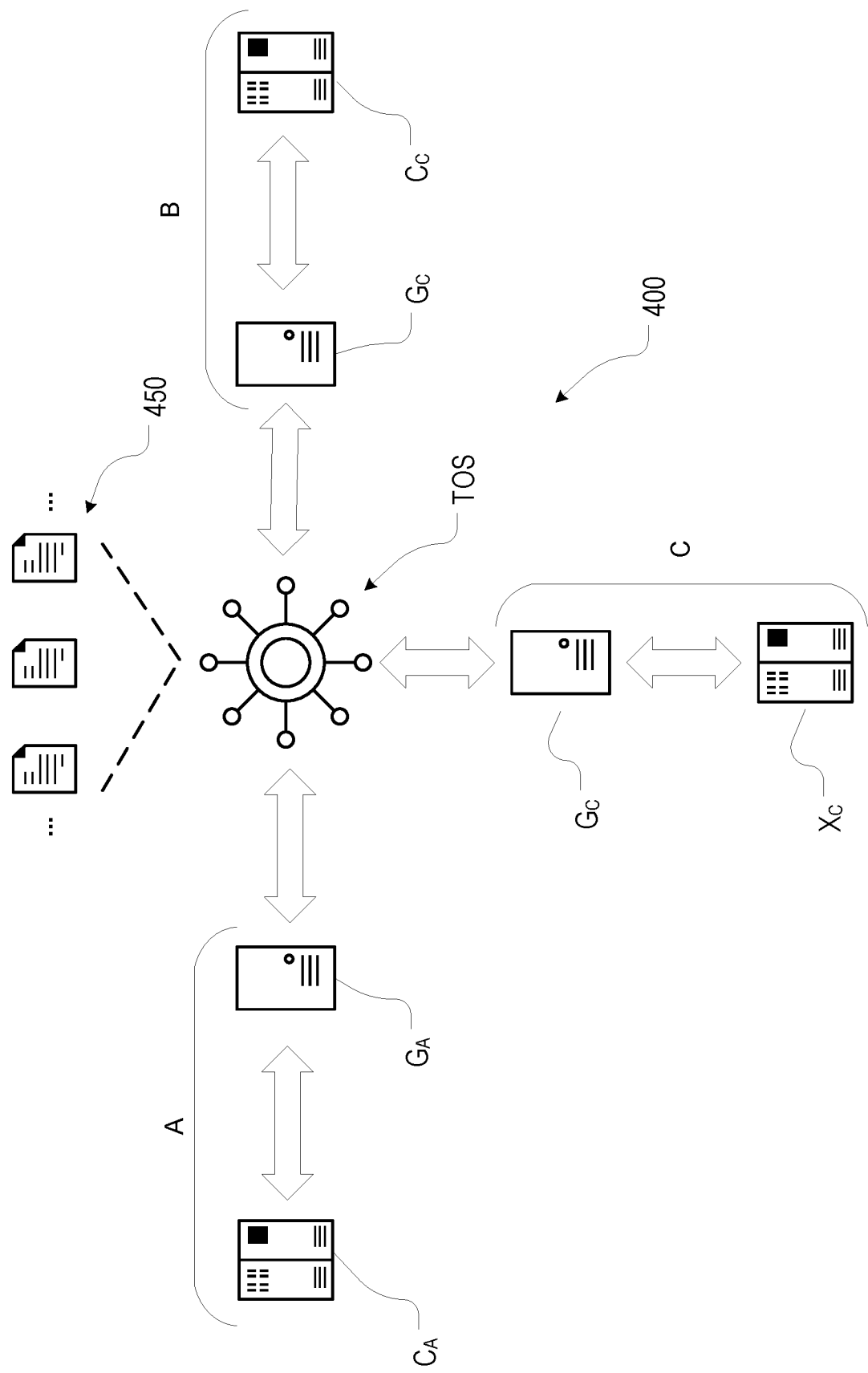
FIG. 4 is a high level diagram of a blockchain system, consistent with some embodiments.

FIG. 4 is a high level diagram of a blockchain system 400, consistent with some embodiments. In the embodiment of FIG. 4, each member organization (for illustrative purposes A, B, and C) of a blockchain-using syndicate may run a total ordering service gateway (TOS gateway), GA, GB, GC, etc. which may in turn, be deployed as a cluster or cloud service within the syndicate's member organizations A, B, C. The TOS gateways GA, GB, GC, etc. may each have read/write access to a total ordering service TOS, which may be maintained by a third party service provider.

The total ordering service TOS in some embodiments may maintain a shared message queue 450 that may be used to publish messages to everyone participating in the blockchain syndicate. For a channel that spans a subset of organizations A, B, etc., the TOS gateways $G_A$, $G_B$, etc. may autonomously cooperate to create a symmetric key K known only to the subset of organizations A, B, etc.; then split the shared key (i.e., symbolically $(K_A, K_B, \text{etc.}) \leftarrow \text{Split}(K)$); distribute parts of the symmetric key and the key shares to the other TOS gateways; and then only persist the key shares $K_A$, $K_B$, etc. (but not the symmetric key K itself) in non-volatile memory. The shared symmetric key K, in contrast, may only be maintained in volatile memory (e.g., RAM) in some embodiments and implementations.

The TOS gateways $G_A$, $G_B$, $G_C$ may then receive transactions from internal clients $C_A$, $C_B$, $C_C$ within the syndicate member organizations A, B, C; encrypt those transactions with the shared symmetric key K; establish total order of the encrypted transactions; decrypt the totally ordered transactions and form blocks; sign the blocks autonomously using their respective long term private blockchain keys; and broadcast the blocks within their organizations A, B, C. The TOS gateways $G_A$, $G_B$, $G_C$ in some embodiments may be aware of each other's public certificates and use them for signature verification (in some embodiments, all protocol messages may be signed). Additionally, as will be discussed in more detail with reference to FIGS. 7-10, TOS gateways $G_A$, $G_B$, $G_C$ may also autonomously rotate these keys, such as in the event of membership reconfiguration, in some embodiments and/or implementations.

The total ordering service TOS in the embodiment of FIG. 4 does not require, and typically does not have access to, the unencrypted transaction information produced by internal clients $C_A$, $C_B$, $C_C$. That is, some embodiments of this disclosure may protect confidentiality of the syndicates and syndicate organizations A, B, C, as the total ordering service TOS, even while being executed by a third party, cannot learn any information about the data it is processing. In this way, the organization that provides the total ordering service TOS does not need to be a trusted syndicate member, and instead, may be a unrelated third party, such as a provider of cloud computing services. Accordingly, some embodiments of the disclosure may include a blockchain with a delegated total ordering service that: (i) enables a total ordering service to be run by a third party; and (ii) does not disclose any transaction information, confidential or otherwise, to that third party.

The third party running the total ordering service TOS in some embodiments may also be used as a total order persistent messaging service. Advantageously, this may allow for limited TOS gateways $G_A$, $G_B$, $G_C$ that only provide the ability to send messages, to receive messages in the same order, and the messages not being deleted.

Another feature and advantage of some embodiments is that they may require relatively low administration overhead, as the blockchain operations can be completely autonomous. This in turn, may enable a relatively smooth blockchain experience for syndicate members A, B, C, etc.

The total ordering service TOS in some embodiments may additionally provide fairness in resource allocation among the members of the blockchain syndicate, as processing generally comprises the upload of transactions and download of transactions to the shared message queue 450. However, because download is simply an aggregation of upload, the internal clients $C_A$, $C_B$, $C_C$ from each organization A, B, C can simply pay for upload of transactions into the total ordering service TOS, and it implicitly accounts for download by all organizations A, B, C.

Additionally, some embodiments may also include one or more of the following security features: (i) autonomous operation, so that the human element is removed from the equation; (ii) resistance to collusion between the total ordering service TOS and a rogue administrator who has access to the file system of its local TOS gateway; (iii) a key establishment protocol that can be modified to use a quantum resistant scheme in addition to the regular one, thus achieving forward secrecy in the presence of quantum computers; and (iv) different keys for different channels, and thus, not requiring full trust every other organization to properly protect those keys.

Distributed Ledger

In some embodiments, the distributed ledger may be a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction, in turn, may result in a set of asset key-value pairs being committed to the distributed ledger as one or more operands, such as creates, updates, deletes, and the like. The distributed ledger may include a blockchain (also referred to as a chain), which is used to store the immutable, sequenced record in blocks. The distributed ledger may also include a state database, which maintains a current state of the blockchain. Some embodiments use one distributed ledger per channel, but other embodiments are possible. Each peer node in these embodiments maintains a copy of the distributed ledger for each channel of which they are a member.

The chain in some embodiments may comprise a transaction log, which may be structured as hash-linked blocks, and each block contains a sequence of N transactions where N is equal to or greater than one. The block header may include a hash of the block's transactions, as well as a hash of the prior block's header. In this way, all transactions on the ledger may be sequenced and cryptographically linked together. Accordingly, it is not reasonably possible to tamper with the ledger data without breaking the hash links in these embodiments. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger in some embodiments may represent the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database, in some embodiments, may be simply an indexed view into the chain's transaction log, it can therefore be regenerated from the chain at any time. The state database may automatically be recovered (or generated if needed) upon peer node start-up, and before transactions are accepted.

Blockchain Architecture

Figure 5A:
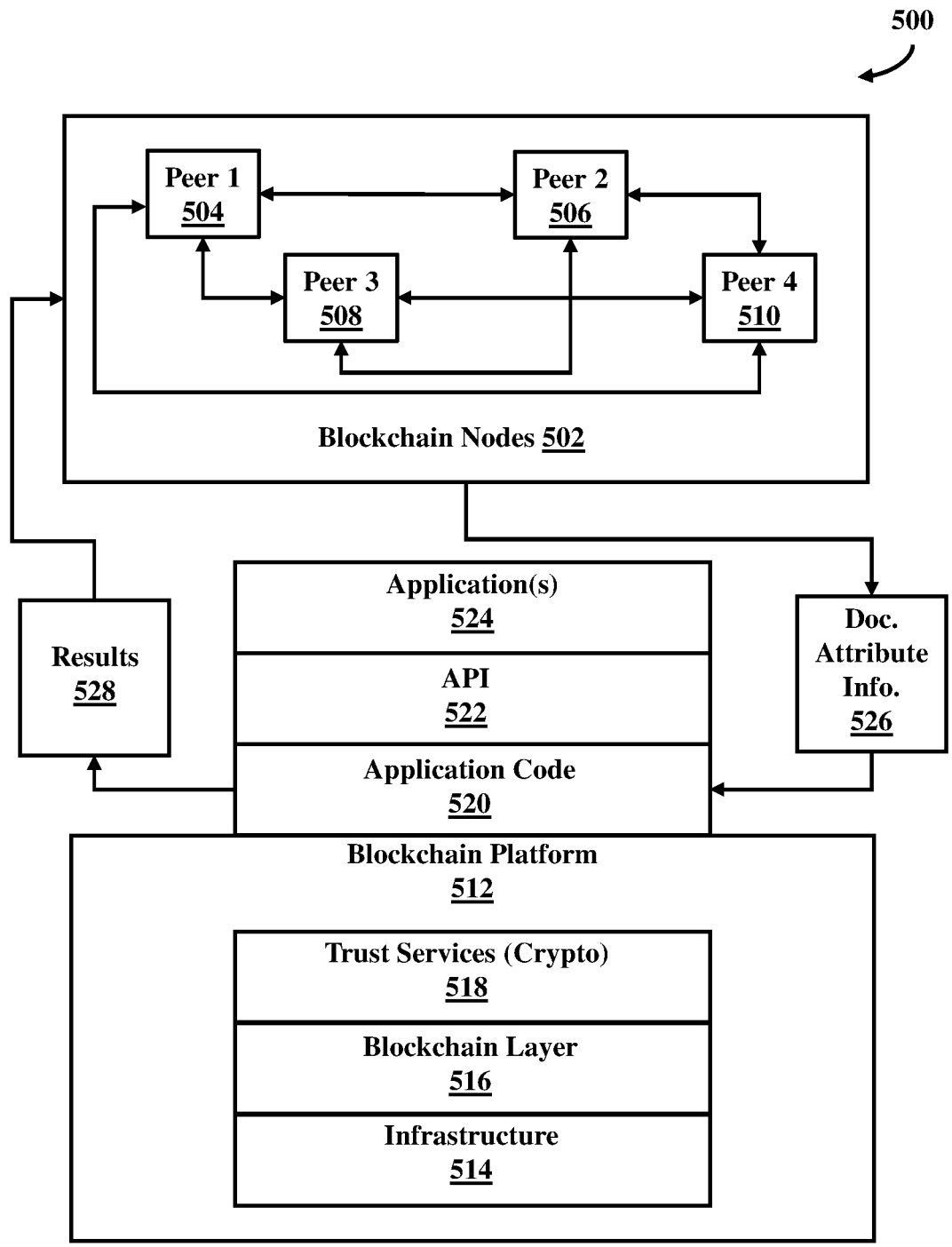
FIG. 5A depicts an example blockchain architecture configuration, consistent with some embodiments.

FIG. 5A illustrates a blockchain architecture configuration 500, consistent with some embodiments. The blockchain architecture 500 in these embodiments may include certain blockchain elements, for example, a group of blockchain nodes 502. The group of blockchain nodes 502, in turn, may include one or more member nodes 504-510 (these four nodes are depicted by example only). These member nodes 504-510 may participate in a number of activities, such as blockchain transaction addition and validation process (consensus). One or more of the member nodes 504-510 may endorse transactions based on endorsement policy and may provide an ordering service for all blockchain nodes in the architecture 500. A member node 504-510 may initiate a blockchain authentication and seek to write to a blockchain immutable ledger stored in blockchain layer 516, a copy of which may also be stored on the underpinning physical infrastructure 514.

The blockchain architecture 500 in some embodiments may include one or more applications 524, which are linked to application programming interfaces (APIs) 522 to access and execute stored program/application code 520 (e.g., chaincode, smart contracts, etc.). The stored program/application code 520, in turn, can be created according to a customized configuration sought by participants and can maintain its own state, control their own assets, and receive external information. The stored program/application code 520 can be deployed as a transaction and installed, via appending to the distributed ledger, on all blockchain nodes 504-510.

A blockchain base or platform 512 may include various layers of blockchain data, services (e.g., cryptographic trust services, virtual execution environment, etc.), and underpinning physical computer infrastructure that may be used to receive and store new transactions and provide access to auditors which are seeking to access data entries. A blockchain layer 516 may expose an interface that provides access to the virtual execution environment necessary to process the program code and engage a physical infrastructure 514. Cryptographic trust services 518 may be used to verify transactions such as asset exchange transactions and keep information private.

The blockchain architecture configuration of FIG. 5A may process and execute the program/application code 520 via one or more interfaces exposed, and services provided, by the blockchain platform 512. The program/application code 520 may control blockchain assets. For example, the code 520 can store and transfer data, and may be executed by member nodes 504-510 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, document attribute(s) information 526 may be processed by one or more processing entities (e.g., virtual machines) included in the blockchain layer 516. A result 528 may include a plurality of linked shared documents. The physical infrastructure 514 may be utilized to retrieve any of the data or information described herein.

In some embodiments, the smart contract may be created via a high-level application and programming language, and then written to a block in the blockchain. The smart contract may include executable code that is registered, stored, and/or replicated with a blockchain (e.g., distributed network of blockchain peers). A transaction is an execution of the smart contract code that can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols in some embodiments.

The smart contract may write data to the blockchain in the format of key-value pairs. In some embodiments, the smart contract code can also read the values stored in a blockchain and use them in application operations. The smart contract code in these embodiments can then write the output of various logic operations into the blockchain. The smart contract code, in some embodiments, may be used to create a temporary data structure in a virtual machine or other computing platforms. Data written to the blockchain in these embodiments may be public or may be encrypted and maintained as private. The temporary data that is used/generated by the smart contract may be held in memory by the supplied execution environment, and then may be deleted once the data needed for the blockchain is identified.

The chaincode in some embodiments may comprise a code interpretation of a smart contract, with additional features. In some embodiments, the chaincode may be implemented as program code deployed on a computing network, where it is executed and validated by chain validators together during a consensus process. The chaincode may receive a hash and may retrieve from the blockchain a hash associated with the data template created by the use of a previously stored feature extractor. If the hashes of the hash identifier and the hash created from the stored identifier template data match, then the chaincode may send an authorization key to the requested service. The chaincode may write to the blockchain data associated with the cryptographic details.

Figure 5B:
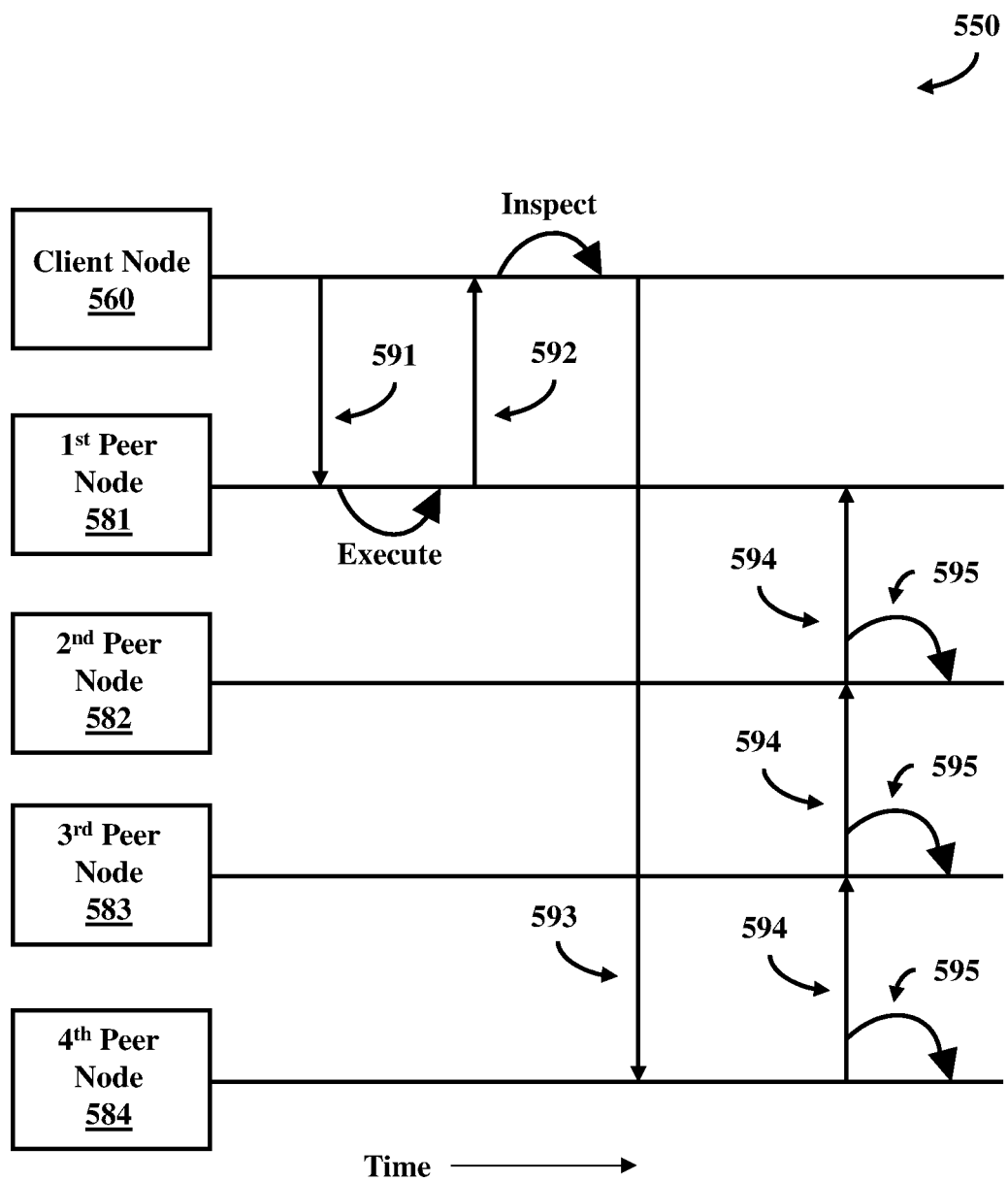
FIG. 5B illustrates a blockchain transactional flow, consistent with some embodiments.

FIG. 5B illustrates an example of a blockchain transactional flow 550 between nodes of the blockchain in accordance with some embodiments. The transaction flow in these embodiments may include a transaction proposal 591 sent by an application client node 560 to an endorsing peer node 581. The endorsing peer 581 may verify the client signature and execute a chaincode function to initiate the transaction. The output may include the chaincode results, a set of key/value versions that were read in the chaincode (read set), and the set of keys/values that were written in chaincode (write set). The proposal response 592 may then be sent back to the client 560, along with an endorsement signature, if approved.

In response, the client 560 may assemble the endorsements into a transaction payload 593 and broadcasts it to an ordering service node 584. The ordering service node 584 may then deliver ordered transactions as blocks to all peers 581-583 on a channel. Before committal to the blockchain, each peer 581-583 may validate the transaction. For example, the peers in some embodiments may check the endorsement policy to ensure that the correct allotment of the specified peers have signed the results and authenticated the signatures against the transaction payload 593.

With continuing reference to FIG. 5B, the client node 560 in some embodiments may initiate the transaction 591 by constructing and sending a request to the peer node 581, which may act an endorser. The client 560 may include an application leveraging a supported software development kit (SDK), which may utilize an available API to generate a transaction proposal. The transaction proposal, in turn, may be a request to invoke a chaincode function so that data can be read and/or written to the distributed ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 581 may verify: (a) that the transaction proposal is well-formed; (b) the transaction has not been submitted already in the past (replay-attack protection); (c) the signature is valid; and (d) that the submitter (client 560, in this example embodiment) is properly authorized to perform the proposed operation on that channel. The endorsing peer node 581 may take the transaction proposal inputs as arguments to the invoked chaincode function. The chaincode may then be executed against a current state database to produce transaction results, including a response value, read set, and write set. In some embodiments, no updates are made to the ledger at this point. Instead, the set of values, along with the endorsing peer node's 581 signature, may be passed back as a proposal response 592 to the SDK of the client 560, which parses the payload for the application to consume.

In response, the application of the client 560 may inspect/verify the endorsing peers' signatures and may compare the proposal responses to determine if the proposal response is the same. If the chaincode only queried the ledger, the application may inspect the query response and would typically not submit the transaction to the ordering service 584. If the client application intends to submit the transaction to the ordering service 584 to update the ledger, the application may determine if the specified endorsement policy has been fulfilled before submitting (i.e., did all peer nodes necessary for the transaction endorse the transaction). Here, the client may include only one of a multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After a successful inspection, in operation 594, the client 560 may assemble endorsements into a transaction and may broadcast the transaction proposal and response within a transaction message to the ordering service 584. The transaction may contain the read/write sets, the endorsing peers' signatures, and a channel ID. The ordering service 584 does not need to inspect the entire content of a transaction in order to perform its operation; instead the ordering service 584 may simply receive transactions from all channels in the network, order them chronologically by channel, and create blocks of transactions per channel.

The blocks of the transaction may be delivered from the ordering service 584 to all peer nodes 581-583 on the channel. The transactions within the block may be validated to ensure any endorsement policy is fulfilled and to ensure that there have been no changes to ledger state for read set variables since the read set was generated by the transaction execution. Transactions in the block may be tagged as being valid or invalid. Furthermore, in operation 595, each peer node 581-583 may append the block to the channel's chain, and for each valid transaction, the write sets are committed to the current state database. An event may be emitted to notify the client application that the transaction (invocation) has been immutably appended to the chain, as well as to notify whether the transaction was validated or invalidated.

Permissioned Blockchains

Figure 6A:
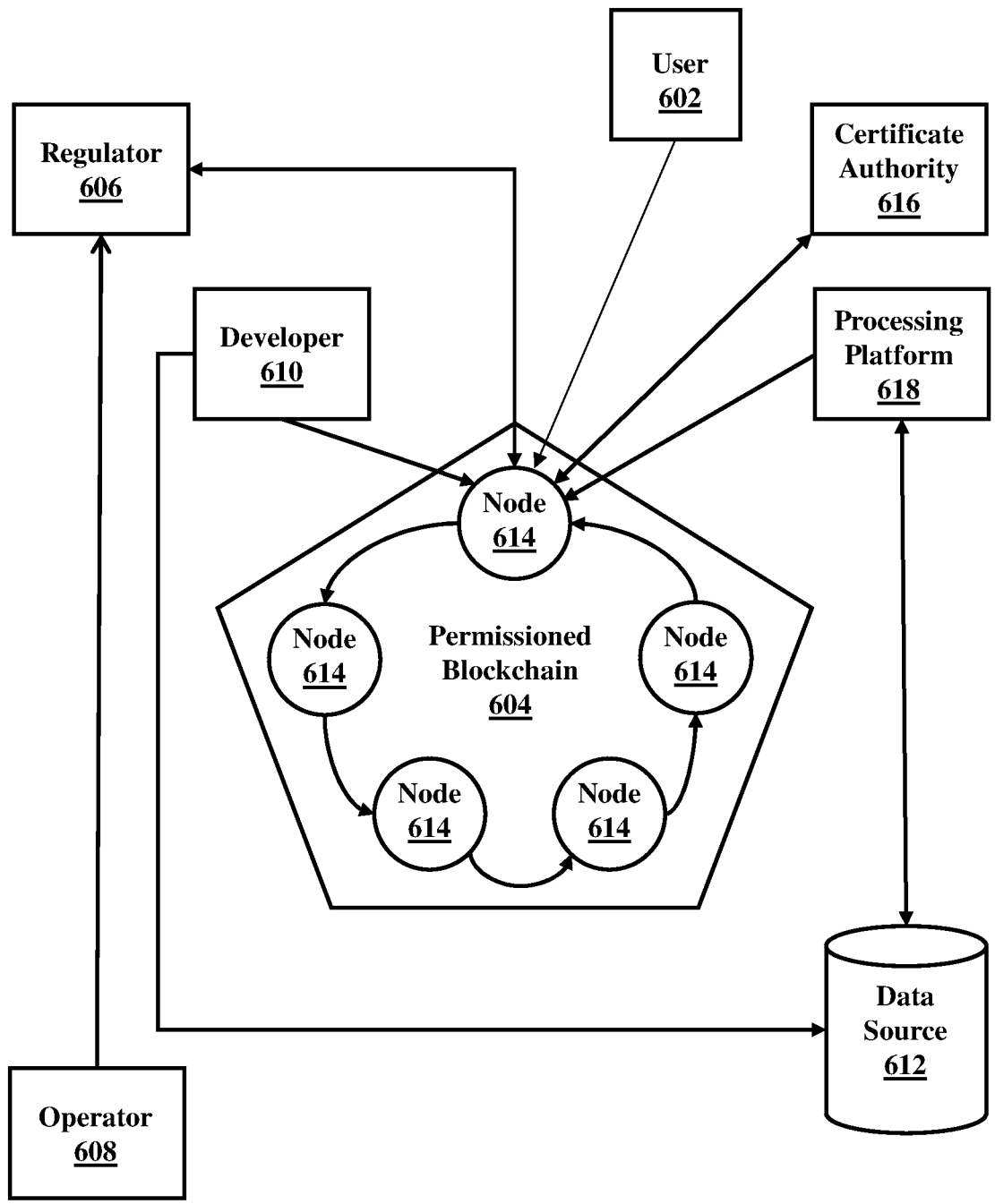
FIG. 6A illustrates a flow diagram, consistent with some embodiments.

FIG. 6A illustrates an example of a permissioned blockchain network, which features a distributed, decentralized peer-to-peer architecture, consistent with some embodiments. In this example, a blockchain user 602 may initiate a transaction to the permissioned blockchain 604. In this example, the transaction may be a deploy, invoke, or query, and may be issued through a client-side application leveraging an SDK, directly through an API, etc. Networks may provide access to a regulator 606, such as an auditor. A blockchain network operator 608 manages member permissions, such as enrolling the regulator 606 as an "auditor" and the blockchain user 602 as a "client." An auditor may be restricted only to querying the ledger, whereas a client may be authorized to deploy, invoke, and query certain types of chaincode.

A blockchain developer 610 can write chaincode and client-side applications in some embodiments. The blockchain developer 610 in these embodiments may deploy chaincode directly to the network through an interface. To include credentials from a traditional data source 612 in chaincode, the developer 610 may use an out-of-band connection to access the data. In this example, the blockchain user 602 may connect to the permissioned blockchain 604 through a peer node 614. Before proceeding with any transactions, the peer node 614 may retrieve the user's enrollment and transaction certificates from a certificate authority 616, which manages user roles and permissions. In some embodiments, blockchain users must possess these digital certificates in order to transact on the permissioned blockchain 604. In other embodiments, blockchain users may be authenticated using other techniques, such as via distributed chains of trust. Meanwhile, a user attempting to utilize chaincode may be required to verify their credentials on the traditional data source 612. Chaincode may use an out-of-band connection to this data through a traditional processing platform 618 to confirm the user's authorization.

Figure 6B:
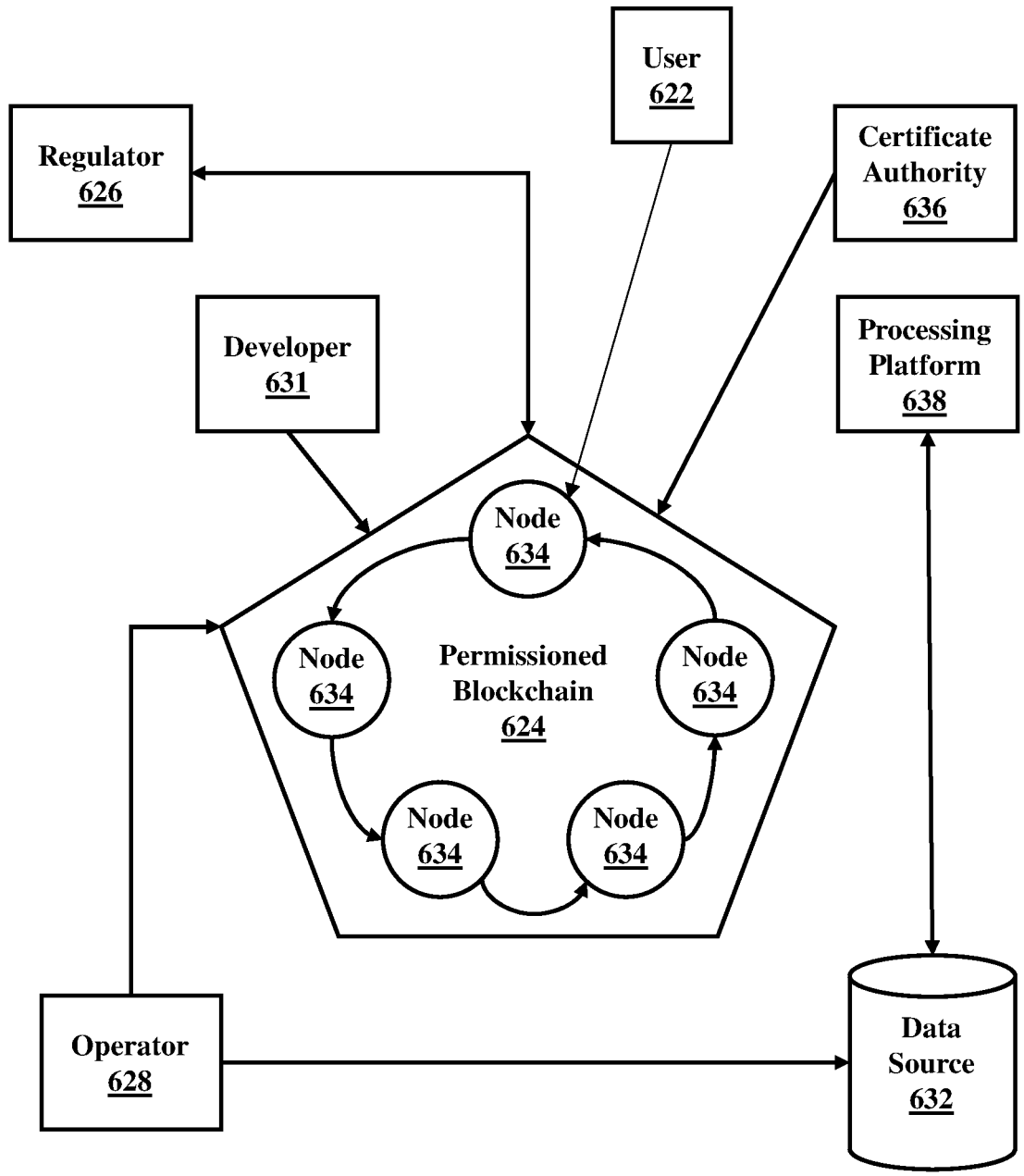
FIG. 6B illustrates a further flow diagram, consistent with some embodiments.

FIG. 6B illustrates another example of a permissioned blockchain network, which features a distributed, decentralized peer-to-peer architecture, consistent with some embodiments. In this example, a blockchain user 622 may submit a transaction to the permissioned blockchain 624. In this example, the transaction can be a deploy, invoke, or query, and may be issued through a client-side application leveraging an SDK, directly through an API, etc. Networks may provide access to a regulator 626, such as an auditor. A blockchain network operator 628 manages member permissions, such as enrolling the regulator 626 as an "auditor" and the blockchain user 622 as a "client." An auditor could be restricted only to querying the ledger, whereas a client could be authorized to deploy, invoke, and query certain types of chaincode.

A blockchain developer 631 in these embodiments may write chaincode and client-side applications. The blockchain developer 631 may deploy chaincode directly to the network through an interface. To include credentials from a traditional data source 632 in chaincode, the developer 631 may use an out-of-band connection to access the data. In this example, the blockchain user 622 connects to the network through a peer node 634. Before proceeding with any transactions, the peer node 634 retrieves the user's enrollment and transaction certificates from the certificate authority 636. In some embodiments, blockchain users must possess these digital certificates in order to transact on the permissioned blockchain 624. In other embodiments, blockchain users may be authenticated using other techniques, such as via distributed chains of trust. Meanwhile, a user attempting to utilize chaincode may be required to verify their credentials on the traditional data source 632. Chaincode can use an out-of-band connection to this data through a traditional processing platform 638 to confirm the user's authorization.

Figure 6C:
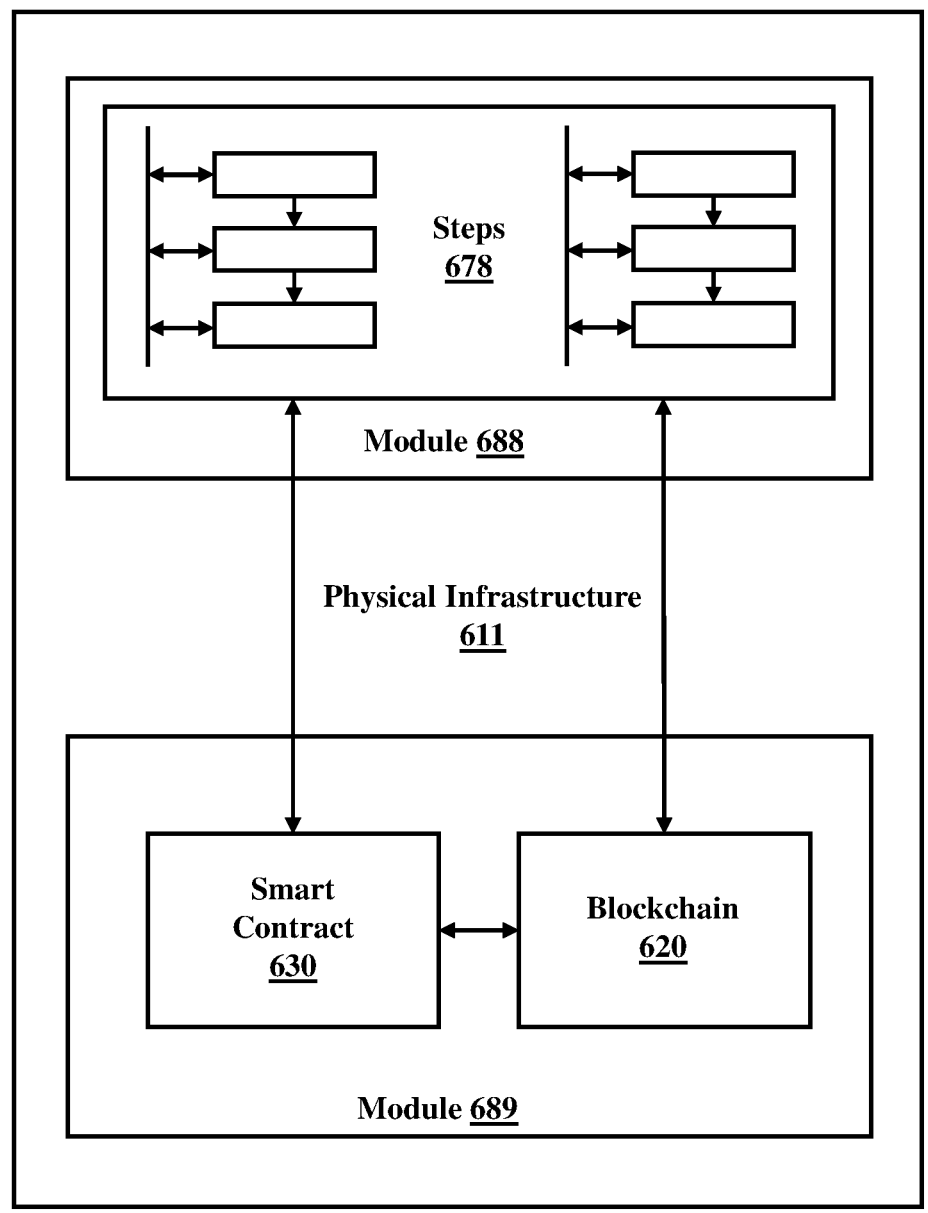
FIG. 6C illustrates an example system configured to perform one or more operations described herein, consistent with some embodiments.

FIG. 6C illustrates an example system that includes a physical infrastructure 611 configured to perform various operations, consistent with some embodiments. Referring to FIG. 6C, the physical infrastructure 611 includes a module 688 and a module 689. The module 619 includes a blockchain 620 and a smart contract 630 (which may reside on the blockchain 620) that may execute any of the operational steps 678 (in module 688) included in any of the example embodiments. The steps/operations 678 may include one or more of the embodiments described or depicted and may represent output or written information that is written or read from one or more smart contracts 630 and/or blockchains 620. The physical infrastructure 611, the module 688, and the module 689 may include one or more computers, servers, processors, memories, and/or wireless communication devices. Further, the module 688 and the module 689 may be the same module.

Figure 6D:
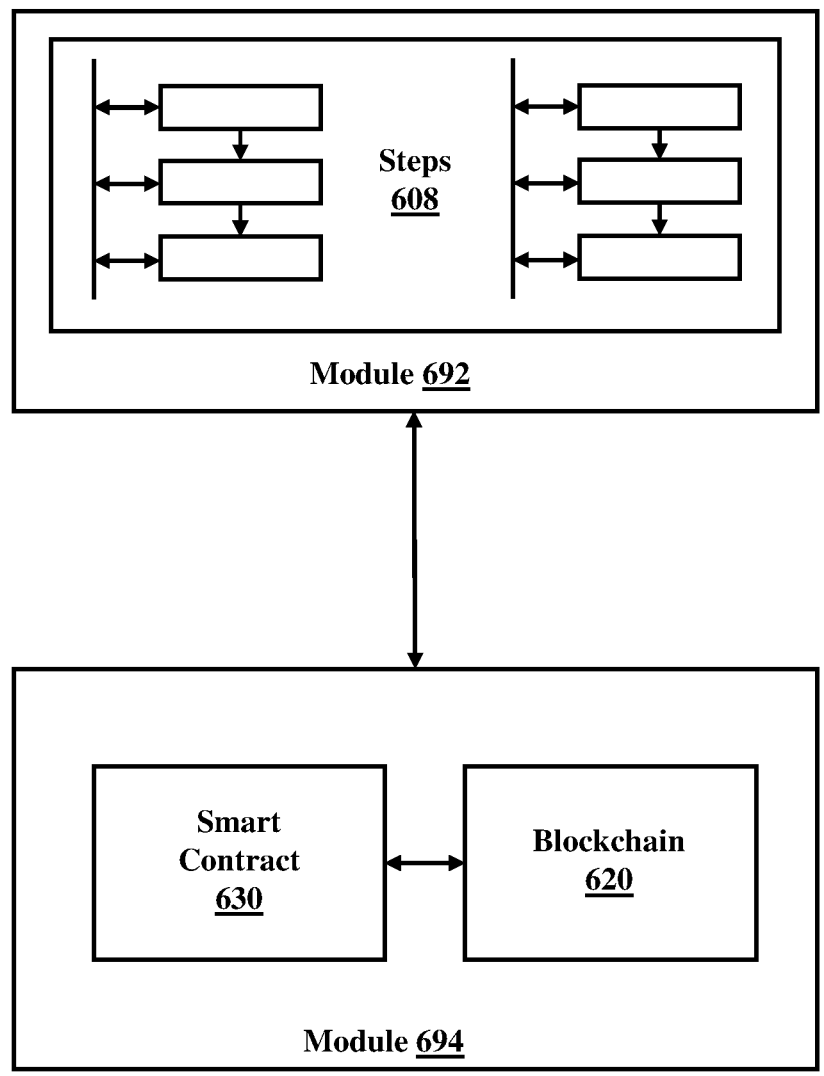
FIG. 6D illustrates another example system configured to perform one or more operations described herein, consistent with some embodiments.

FIG. 6D illustrates another example system configured to perform various operations, consistent with some embodiments. Referring to FIG. 6D, the system includes a module 692 and a module 694. The module 694 includes a blockchain 620 and a smart contract 630 (which may reside on the blockchain 620) that may execute any of the operational steps 678 (in module 692) included in any of the example embodiments. The steps/operations 678 may include one or more of the embodiments described or depicted and may represent output or written information that is written or read from one or more smart contracts 630 and/or blockchains 620. The physical module 692 and the module 694 may include one or more computers, servers, processors, memories, and/or wireless communication devices. Further, the module 692 and the module 694 may be the same module.

Figure 6E:
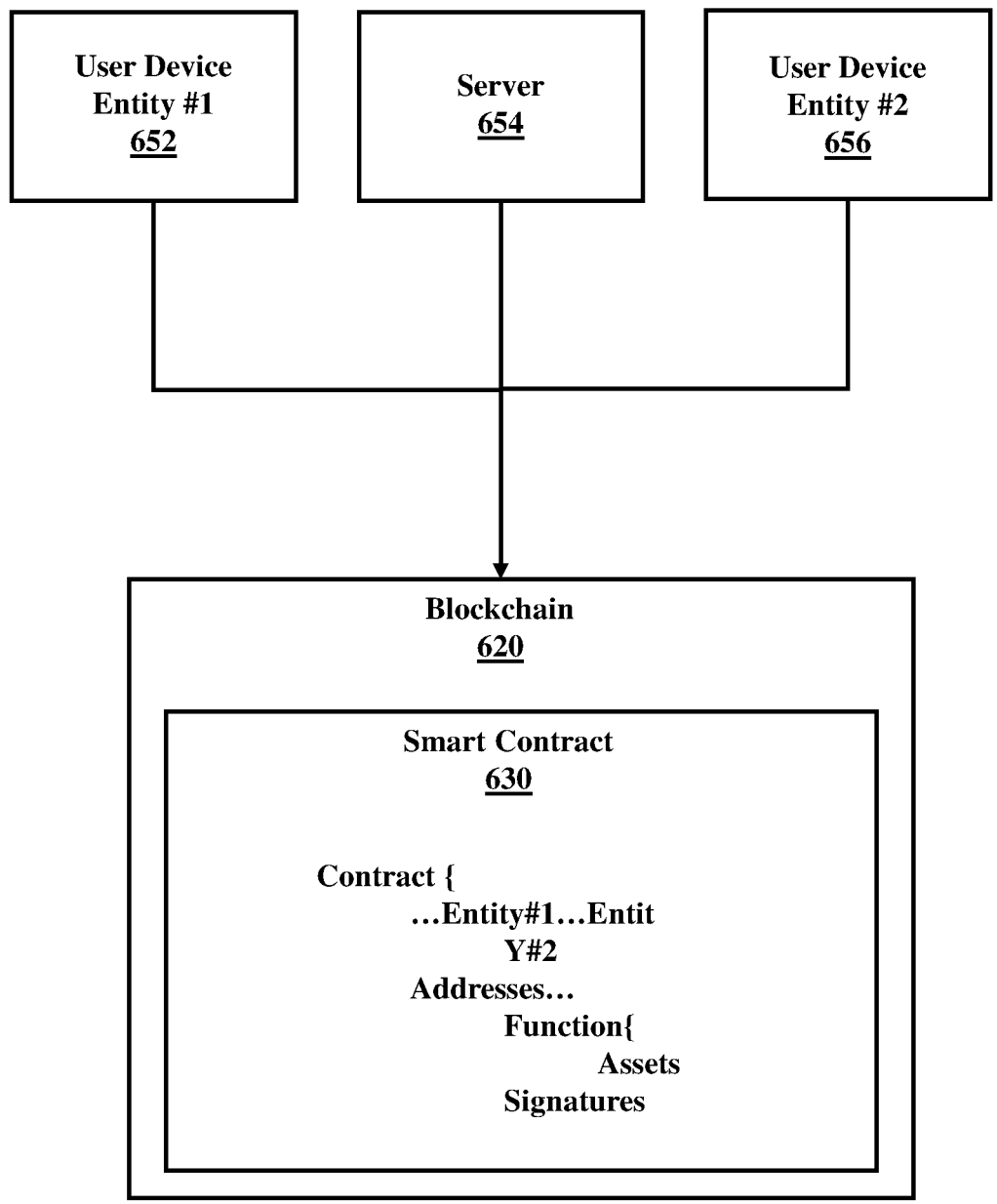
FIG. 6E illustrates a further example system configured to utilize a smart contract, consistent with some embodiments.

FIG. 6E illustrates an example system configured to utilize a smart contract configuration among contracting parties and a mediating server configured to enforce the smart contract terms on the blockchain 620, consistent with some embodiments. Referring to FIG. 6E, the configuration may represent a communication session, an asset transfer session, or a process or procedure that is driven by a smart contract 630, which explicitly identifies one or more user devices 652 and/or 656. The execution, operations, and results of the smart contract execution may be managed by a server 654. Content of the smart contract 630 may require digital signatures by one or more of the entities 652 and 656, which are parties to the smart contract transaction. The results of the smart contract execution may be written to a blockchain 620 as a blockchain transaction. The smart contract 630 resides on the blockchain 620, which may reside on one or more computers, servers, processors, memories, and/or wireless communication devices.

Figure 6F:
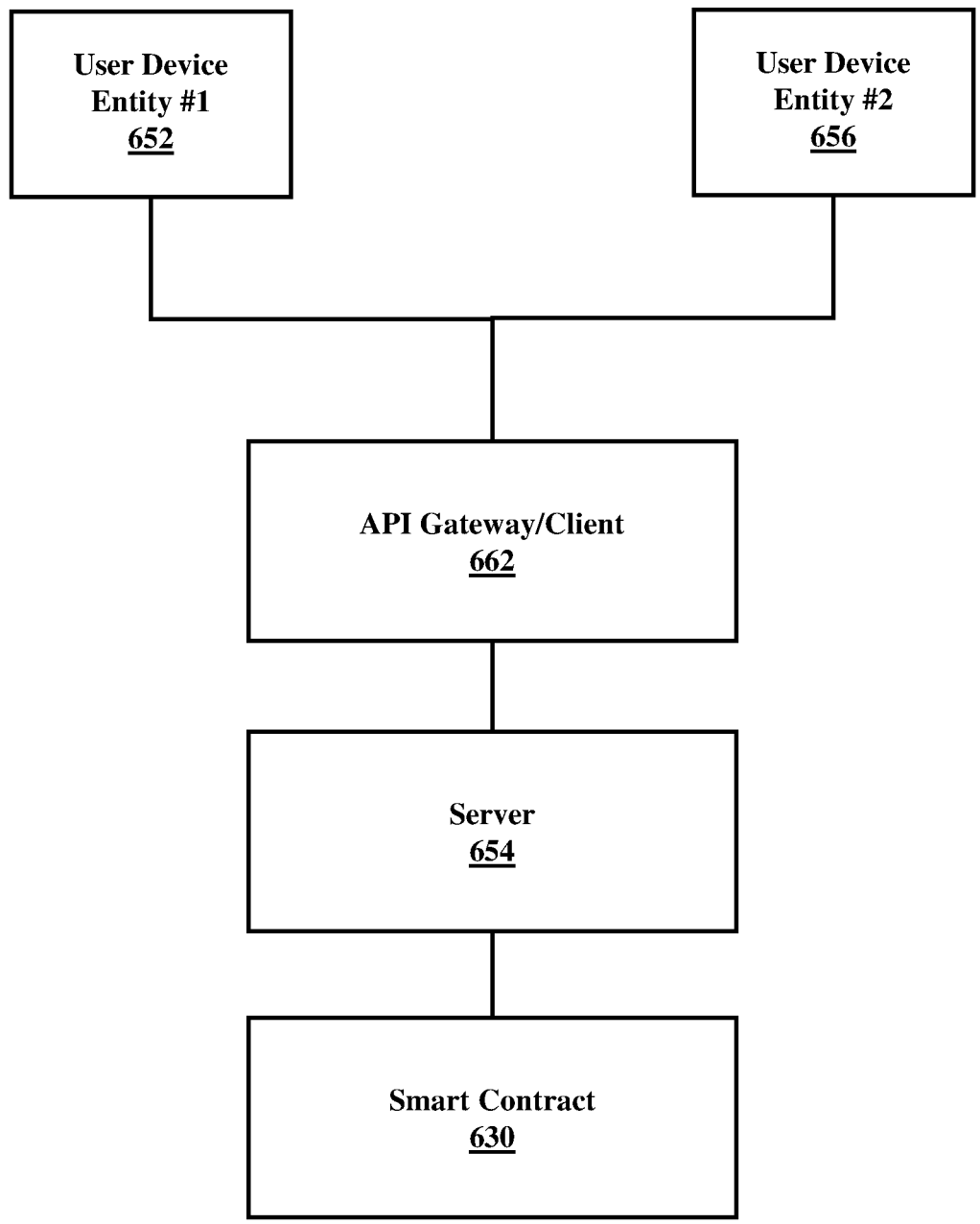
FIG. 6F illustrates a system including a blockchain, consistent with some embodiments.

FIG. 6F illustrates a system 660, including a blockchain, consistent with some embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world stage as well as submit transactions into the blockchain network where depending on the smart contract 630 and endorsement policy, endorsing peers will run the smart contracts 630.

Channel Creation

Figure 7A:
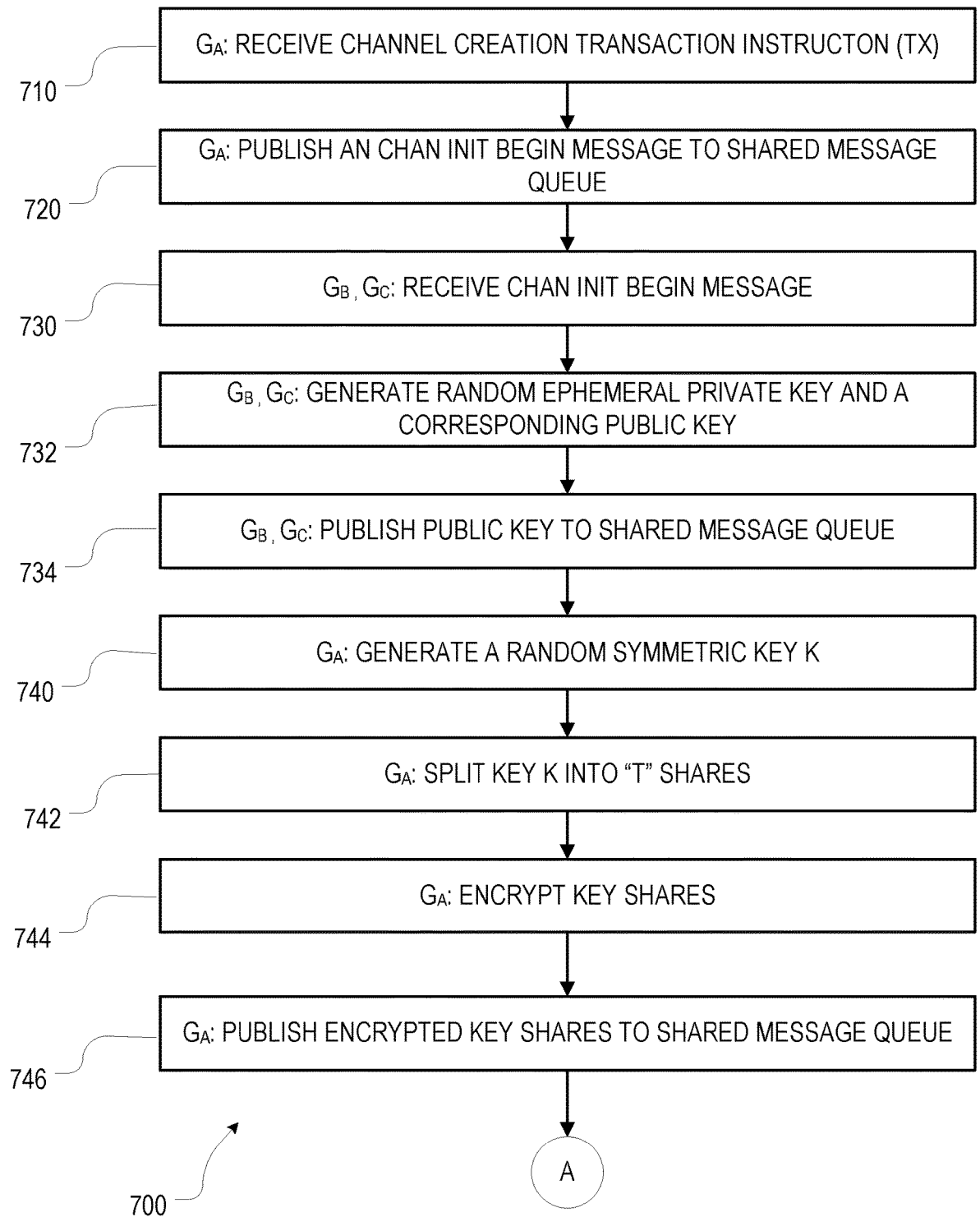
FIGS. 7A and 7B illustrate one method of creating a channel, consistent with some embodiments.
Figure 7B:
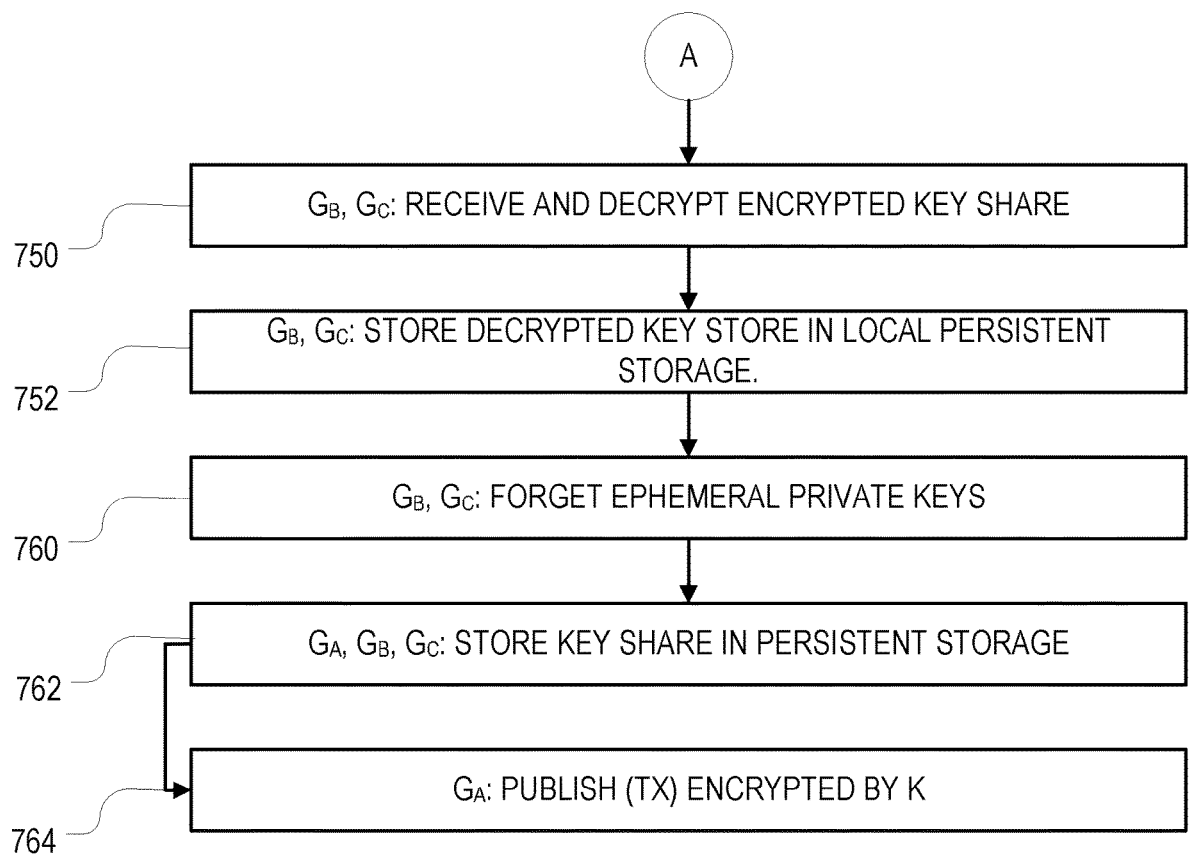

FIGS. 7A and 7B (collectively FIG. 7) illustrate one method 700 of creating a channel in a blockchain network, consistent with some embodiments. At operation 710, a blockchain admin sends channel creation transaction message (tx) to TOS gateway $G_A$. The TOS gateway $G_A$ may respond at operation 720 by publishing a channel initialization message ("CHAN INIT BEGIN") to the shared message queue 450. TOS gateways $G_B$, $G_C$, associated with organizations B and C respectively, may receive the message from the total ordering service TOS at operation 730. In response, each receiving TOS gateway $G_B$, $G_C$ may generate a random ephemeral private key and a corresponding public key $P_B$, $P_C$ pair at operation 732, and then may publish the public keys $P_B$, $P_C$ to the shared message queue 450 at operation 734.

Next, the TOS gateway $G_A$ for organization A may generate a random symmetric key K at operation 740, may split the generated key K into "t" shares (three shares in this example, one for each TOS gateway $G_A$, $G_B$, $G_C$, etc. in the blockchain) at operation 742. The TOS gateway $G_A$ may then distribute the key shares to the other TOS gateways. This may include encrypting the other gateways' split keys:

$$P_B(K_B), P_C(K_C), \text{etc.}$$

at operation 744, and publishing the resulting cipher-texts at operation 746. Each other TOS gateway $G_B$, $G_C$, etc. may decrypt its key share ($K_B$, $K_C$, etc.) at operation 750, and may store the decrypted key share along with its part of the symmetric key H(K) on its local persistent storage at operation 752. Alternatively, as will be described in more detail below, each TOS gateway $G_A$, $G_B$, $G_C$ may generate its own key share from the symmetric key.

At operation 760, each other TOS gateway $G_B$, $G_C$ may publish an CHAN INIT END message and then may forget (i.e., delete) their ephemeral private keys. TOS gateways $G_A$, $G_B$, $G_C$ may store their key splits $K_A$, $K_B$, $K_C$ on their own persistent storage at operation 762 and may publish K(tx) at operation 764. In this way, the published transaction (tx) may be the creation of the channel transaction. The previous operations may establish the encryption key that encrypts the transaction. That key may be encrypted in some embodiments to prevent the TOS from seeing its content, as it may contain sensitive information, such as who are the parties in the channel, etc.

Symmetric Key Derivation

In some embodiments, the encryption key may be used as a seed to a key derivation algorithm that changes the key every number of messages deterministically:

$$\{SHA256(K\|X\|i)\}_{X\in\{``A",``B",``C"\}}$$

where "i" is a counter that may be periodically incremented, such as after a predefined number of messages (e.g., $2^{32}$ messages, $2^{96}$ messages), weekly, monthly, quarterly, etc. The shares, in turn, may be distributed uniformly random according to the field that is used. One advantage of using this system is that the various TOS gateways $G_A$, $G_B$, etc. may not use the same counter value and may not have to coordinate on how to seed the counters. Another advantage is that this system may automatically rotate the order of the key shares among the blockchain members (e.g., TOS gateway $G_N$ may have the first key share during the first counter period, and the fifth key share during the second counter period, etc.)

Symmetric Key Recovery

Figure 8:
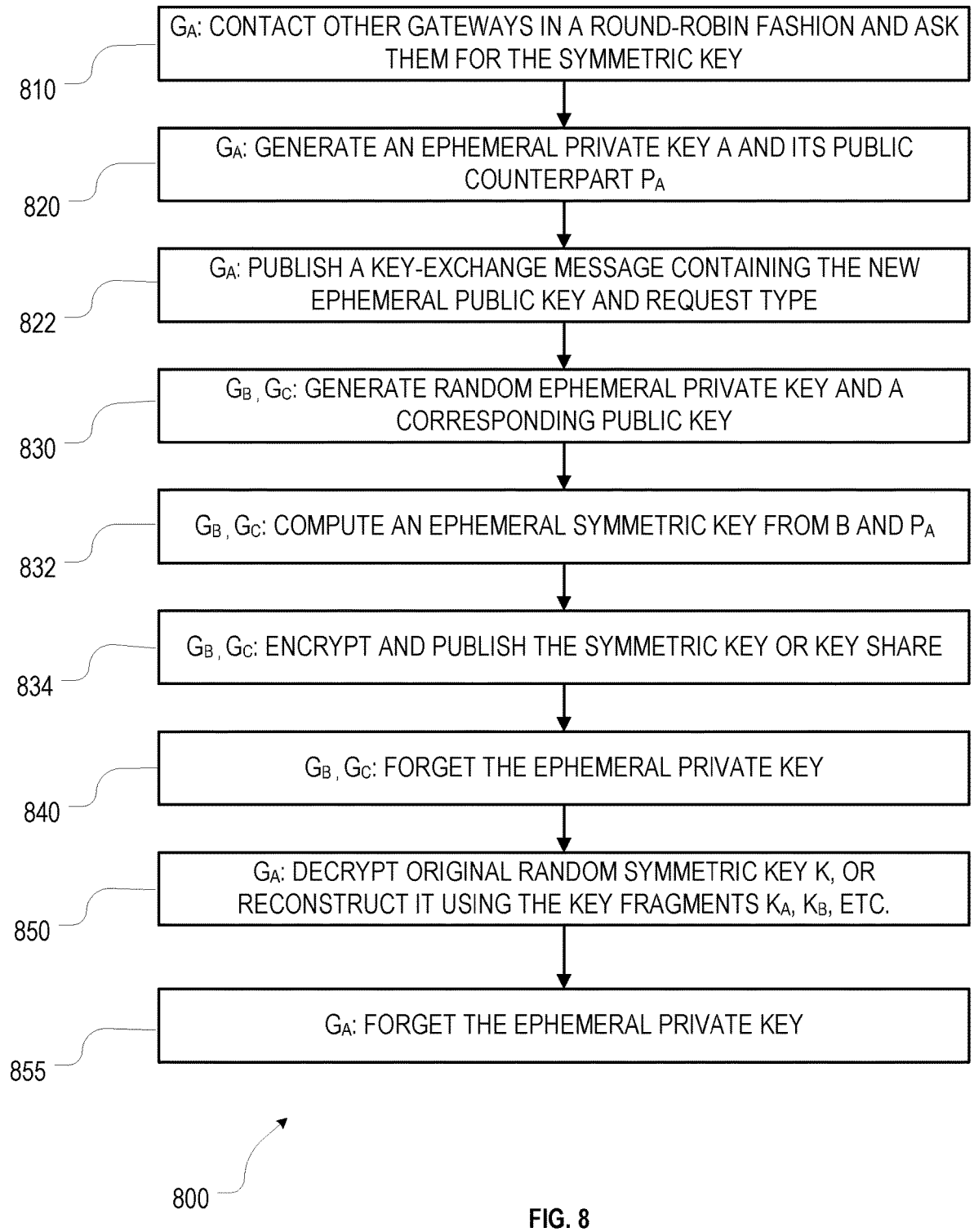
FIG. 8 illustrates one method of symmetric key recovery by a total order service gateway (TOS gateway), consistent with some embodiments.

In some embodiments, the symmetric key K of a channel will not be written to non-volatile storage (e.g., disk), but instead, only saved in volatile storage (e.g., random access memory). FIG. 8 illustrates one method 800 of symmetric key recovery by TOS gateway $G_A$, consistent with some embodiments. To decrypt or encrypt messages obtained from the total ordering service, a TOS gateway $G_A$ may either to reconstruct the secret by fetching enough key shares from remote TOS gateways $G_B$, $G_C$, etc., or just get it from another TOS gateway $G_B$, $G_C$, etc. that had previously reconstructed it. A TOS gateway in some embodiments cannot compute its own share without knowing the shares of the other gateways because it lacks sufficient information.

To obtain the symmetric key from another TOS gateway, the TOS gateway $G_A$ may first contact TOS gateways $G_B$, $G_C$, etc. in a round-robin fashion and asks them for the symmetric key at operation 810. If no other TOS gateway $G_B$, $G_C$, etc. has the symmetric key, the TOS gateway $G_A$ will begin to reconstruct it using the key shares $K_B$, $K_C$, etc. of "t-1" TOS gateways $G_B$, $G_C$, etc., where "t" may be selected by the administrator of the blockchain network based on the network's security needs.

TOS gateways, however, may not share any peer to peer-to-peer IP connection in some embodiments. Instead, they may communicate through the shared messaging queue 450 by first initiating/running an ephemeral key pair establishment protocol at operations 820-836, via the shared messaging queue, to establish a symmetric encryption key to be used to encrypt the exchange of K and/or its shares. More specifically, TOS gateway $G_A$ may first generate an ephemeral private key α and its public counterpart $P_\alpha$ at operation 820, and publish a key-exchange message (which may be unencrypted. In general, the key exchange protocol in some embodiments is designed to work over an insecure medium to establish a symmetric encryption key. Some key exchange embodiments, however, may also use encryption) to the shared message queue, and directed to another TOS gateway (e.g., TOS gateway $G_B$), containing the new ephemeral public key (symbolically {KEX_$G_B$, $P_\alpha$}) onto the shared messaging queue 450 at operation 822. If TOS gateway $G_A$ wants to recover the original random symmetric key K, it can also append a key request ("KEY") to the message at operation 822; likewise, if TOS gateway $G_A$ wants to obtain a key share, it can also append a key share request ("SHR") at operation 822.

In response to the key-exchange message, TOS gateway $G_B$ may generate an ephemeral private key β and its public counterpart $P_β$ at operation 830. TOS gateway $G_B$ may then compute an ephemeral symmetric key ($KEX_{AB}$) from β and $P_A$ at operation 832. TOS gateway $G_B$ may then encrypt (using $KEX_{AB}$) and publish the symmetric key (i.e., {$P_β$, $KEX_{AB}$(K)}) to the shared messaging queue in response to a "KEY" request from TOS gateway $G_A$, or may encrypt and publish TOS gateway $G_B$'s key share (i.e., {$P_β$, $KEX_{AB}$($K_B$)} to the shared messaging queue in response to a "SHR" request from TOS gateway $G_A$, at operation 834.

At operation 840, TOS gateway $G_B$ may forget the ephemeral private key β. That is, it may delete the ephemeral private key from its volatile memory, having never stored it in its non-volatile memory. TOS gateway $G_A$ may decrypt the original random symmetric key K, or reconstruct K using the key fragments $K_A$, $K_B$, etc. at operation 850. TOS gateway $G_A$ may then also forget its ephemeral private key α at operation 855. In this way, the original random symmetric key K is still protected, even if an entity gains access to the shared messaging queue 450.

Syndicate Membership Expansion

Figure 9:
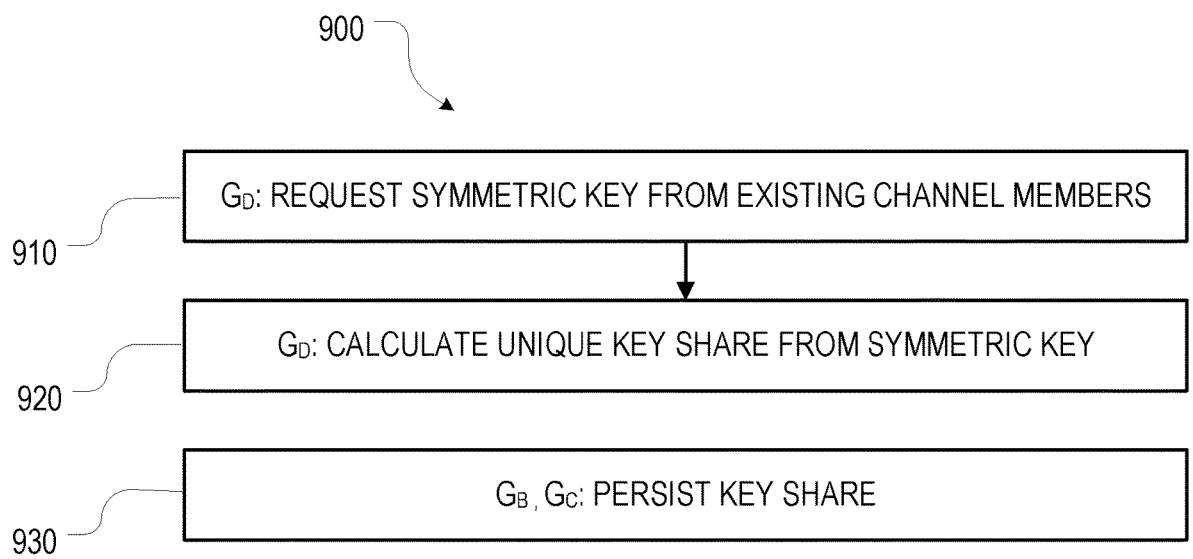
FIG. 9 is a flow chart illustrating one method 900 of expanding membership in a blockchain, consistent with some embodiments.

FIG. 9 is a flow chart illustrating one method 900 of expanding membership in a blockchain, consistent with some embodiments. In this embodiment, whenever a new member/organization "D" joins the channel, its TOS gateway $G_D$ may obtain the shared key K and its own key share $K_D$. The TOS gateway $G_D$ begins at operation 910 by contacting "t" of the existing channel members A, B, C, etc. using the protocol described with reference to FIG. 8 in order to reconstruct the current symmetric key K and store it in its volatile memory (only), where "t" is a number selected by an administrator for the blockchain based on its security profile. The new TOS gateway $G_D$ may then compute its own unique key share $K_D$ i.e., one that is different from all other key shares $K_A$, $K_B$, $K_C$, etc. at operation 920 using the methods described above, and may stores $K_D$ in its persistent storage at operation 930. Alternatively, one of the other TOS gateways may compute the key share $K_D$ and transmit it along with the shared symmetric key.

Likewise, when a new member D is detected in the channel configuration, all existing TOS gateways $G_A$, $G_B$, $G_C$, etc. may engage with the new TOS gateway $G_D$ in an ephemeral key pair establishment session, after which the new TOS gateway $G_D$ gains K and $K_D$.

Syndicate Membership Removal

Figure 10A:
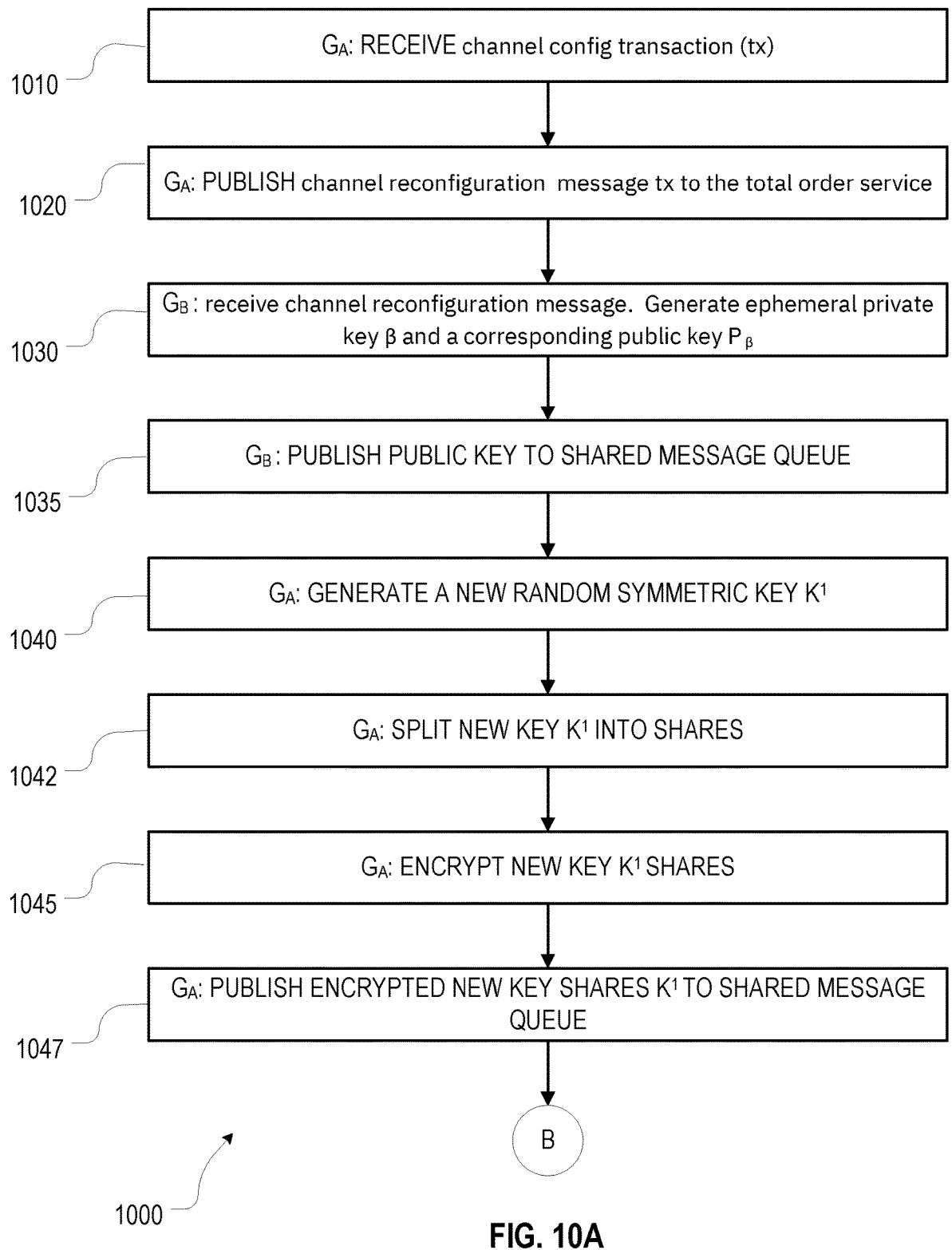
FIGS. 10A and 10B illustrate one method of rotating keys, consistent with some embodiments.
Figure 10B:
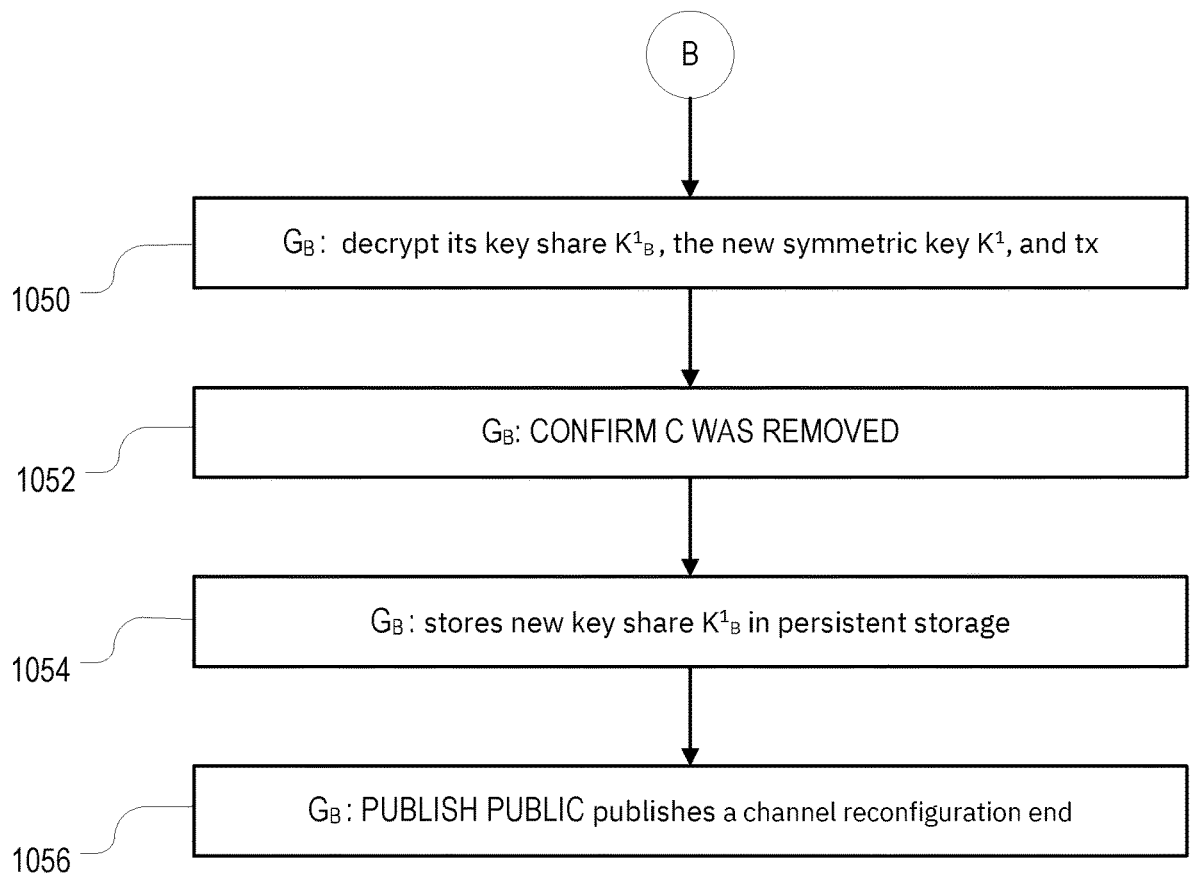

When a member is removed from a channel by the blockchain members A, B, C and/or the blockchain IT administrator, the total ordering service TOS may rotate the encryption key K so that the removed member can no longer decrypt messages in the shared message queue 450. FIGS. 10A and 10B (collectively FIG. 10) illustrate one such method of rotating keys 1000, consistent with some embodiments. In this illustrative example, assume for illustrative purposes only, that organizations A and B want to remove organization C from the channel. At operation 1010, a blockchain administrator sends a channel config transaction (tx) to TOS gateway $G_A$, which may respond at operation 1020 by publishing a channel reconfiguration ("CHAN RECONF A B BEGIN") message tx to the total ordering service TOS.

TOS gateway $G_B$ may receive the channel reconfiguration message and may respond by generating a random ephemeral private key β and a corresponding public key $P_β$ at operation 1030. TOS gateway $G_B$ may then publish the public key $P_β$ to the total ordering service TOS at operation 1035.

TOS gateway $G_A$ may respond by generating a new random symmetric key $K^1$ at operation 1040, splitting it to n shares (where n equals the remaining number of members, two in this case) at operation 1042. TOS gateway $G_A$ may then encrypt the key share(s) using the other TOS gateways (s) $G_B$ ephemeral public key (e.g., for $G_B$: $P_β(K^1_B)$, $P_β(K^1)$, and $K^1(tx)$) at operation 1045 and publishes them to the total ordering service TOS at operation 1047. That is, some embodiments may first change the key and then make all but the removed organization learn the new key. However, these embodiments may still need to apply the reconfiguration to the blockchain itself, so these embodiments may encrypt the reconfiguration transaction with the new key and then send it. Alternately, TOS gateway $G_B$ may compute its own key share using the new symmetric key $K^1$, using the methods described above.

TOS gateway $G_B$ may decrypt its key share $K^1_B$, the new symmetric key $K^1$, and tx at operation 1050. TOS gateway $G_B$ may then confirm that indeed organization C was removed from the channel at operation 1052, and if so, stores $K^1_B$ in its persistent storage at operation 1054, and publishes a channel reconfiguration end ("CHAN RECONF A B END") message to the total ordering service TOS at operation 1056.

Syndicate Membership Reconfiguration

In order to support re-adding removed organizations and/or reconfiguring channels (e.g., channel creation), each TOS gateway $G_A$, $G_B$, etc. may store key shares $K_A$, $K_B$, etc. according to block ranges with continuous membership. In these events, the previous key shares may be used in the block range if all current and future members of the channel acknowledge persisting their key shares. Similarly, any new organizations that are onboarded will need to learn the symmetric keys of the past.

Non-Repudiation and Integrity Assurances

Some embodiments may support non-repudiation and provide integrity assurances. These embodiments may be desirable in the event the total ordering service TOS to behaves incorrectly or malfunctions, and as a result, the various TOS gateways $G_A$, $G_B$, etc. receive messages in different orders. Similarly, these embodiments may be desirable in the event that one member organization A, B, etc. falsely asserting that the total ordering service TOS sent them messages in different order than they received.

To be able to detect such an event if it indeed happened, or refute an incorrect claim, each TOS gateway in some embodiments may periodically (e.g., every B blocks or T time) publish a message that may contains: (i) block ranges [i, j] for the message; and (ii) a Merkle root (e.g., a hash of all the hashes of all the transactions that are part of a block in a blockchain network) with the blocks indexed [i, j] are its leaves. In case a TOS gateway $G_A$, $G_B$, etc. detects that it has forked from the majority of the other network members, the TOS gateway may halt operation and returns a special error when servicing API calls.

Block Processing

Figure 11A:
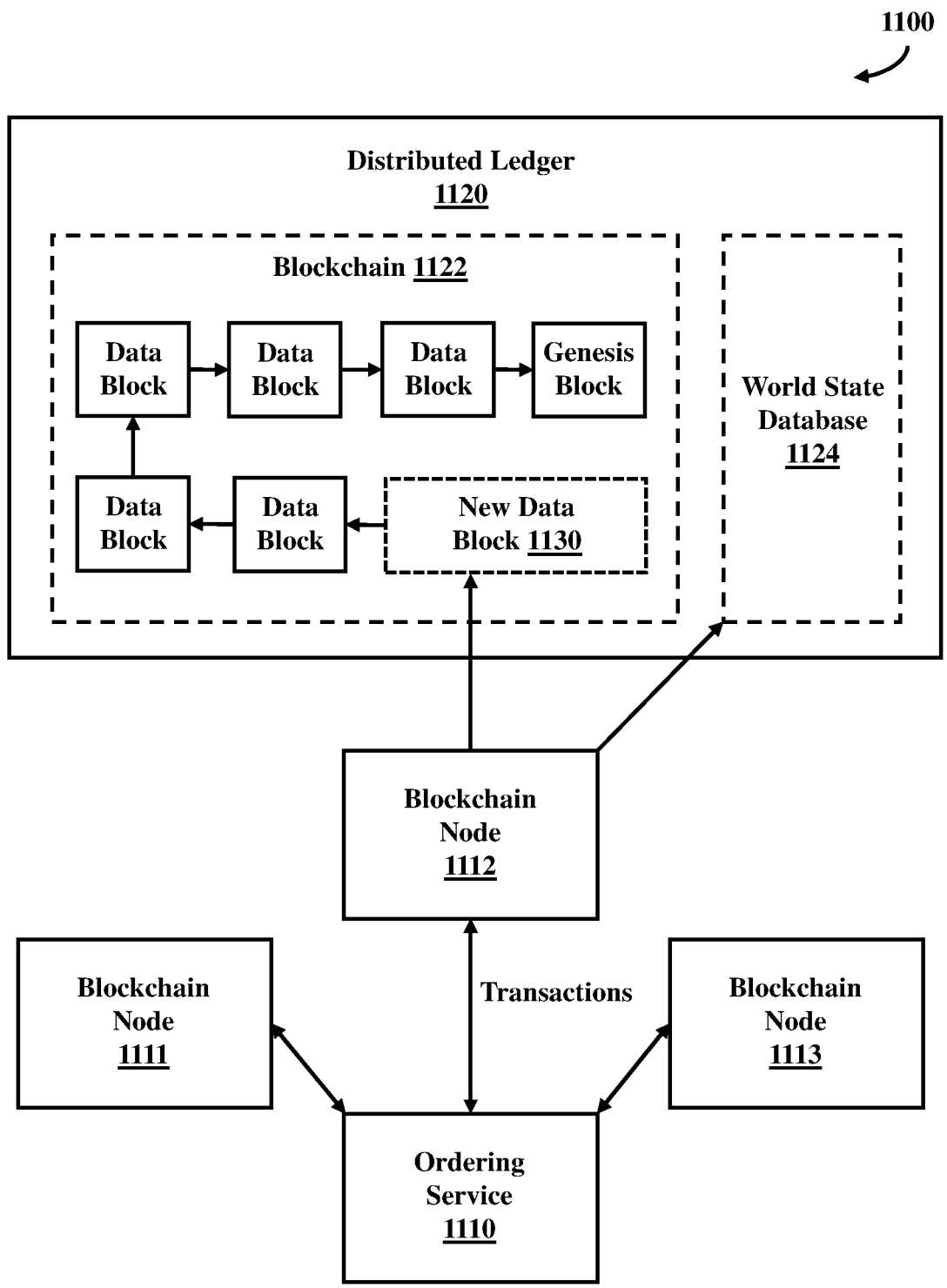
FIG. 11A illustrates a process for a new block being added to a distributed ledger, according to example embodiments.
Figure 11B:
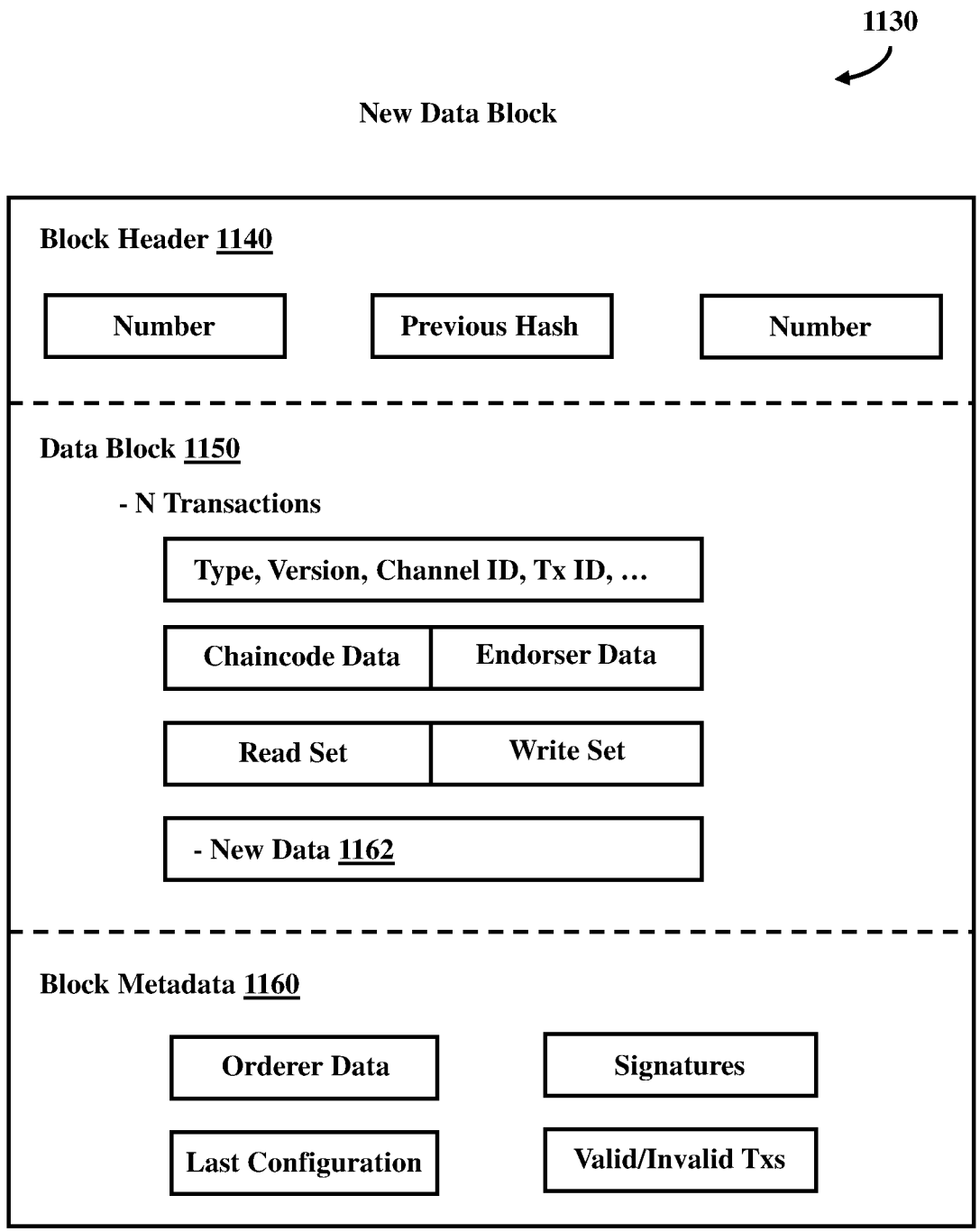
FIG. 11B illustrates contents of a new data block, according to example embodiments.

FIG. 11A illustrates a process 1100 of a new data block 1130 being added to a distributed ledger 1120, consistent with some embodiments, and FIG. 11B illustrates contents of a new data block 1130 for blockchain, consistent with some embodiments. The new data block 1130 may contain document linking data.

Referring to FIG. 11A, clients (not shown) may submit transactions to blockchain nodes 1111, 1112, and/or 1113. Clients may be instructions received from any source to enact activity on the blockchain 1122. As an example, clients may be applications that act on behalf of a requester, such as a device, person, or entity to propose transactions for the blockchain. The plurality of blockchain peers (e.g., blockchain nodes 1111, 1112, and 1113) may maintain a state of the blockchain network and a copy of the distributed ledger 1120. Different types of blockchain nodes/peers may be present in the blockchain network including endorsing peers which simulate and endorse transactions proposed by clients and committing peers which verify endorsements, validate transactions, and commit transactions to the distributed ledger 1120. In some embodiments, the blockchain nodes 1111, 1112, and 1113 may perform the role of endorser node, committer node, or both.

The distributed ledger 1120 may include a blockchain which stores immutable, sequenced records in blocks, and a state database 1124 (current world state) maintaining a current state of the blockchain 1122. One distributed ledger 1120 may exist per channel and each peer maintains its own copy of the distributed ledger 1120 for each channel of which they are a member. The blockchain 1122 may be a transaction log, structured as hash-linked blocks where each block contains a sequence of N transactions. Blocks may include various components such as shown in FIG. 11B. The linking of the blocks (shown by arrows in FIG. 11A) may be generated by adding a hash of a prior block's header within a block header of a current block. In this way, all transactions on the blockchain 1122 may be sequenced and cryptographically linked together preventing tampering with blockchain data without breaking the hash links. Furthermore, because of the links, the latest block in the blockchain 1122 represents every transaction that has come before it. The blockchain 1122 may be stored on a peer file system (local or attached storage), which supports an append-only blockchain workload.

The current state of the blockchain 1122 and the distributed ledger 1120 may be stored in the state database 1124. Here, the current state data represents the latest values for all keys ever included in the chain transaction log of the blockchain 1122. Chaincode invocations execute transactions against the current state in the state database 1124. To make these chaincode interactions more efficient, the latest values of all keys may be stored in the state database 1124. The state database 1124 may include an indexed view into the transaction log of the blockchain 1122, it can therefore be regenerated from the chain at any time. The state database 1124 may automatically get recovered (or generated if needed) upon peer start-up, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement, which is a signed response from the endorsing node to the client application indicating the endorsement of the simulated transaction. The method of endorsing a transaction depends on an endorsement policy that may be specified within chaincode. An example of an endorsement policy is "the majority of endorsing peers must endorse the transaction." Different channels may have different endorsement policies. Endorsed transactions are forward by the client application to ordering service 1110.

The ordering service 1110 accepts endorsed transactions, orders them into a block, and delivers the blocks to the committing peers. For example, the ordering service 1110 may initiate a new block when a threshold of transactions has been reached, a timer times out, or another condition. In the example of FIG. 11A, blockchain node 1112 is a committing peer that has received a new data new data block 1130 for storage on blockchain 1122. The first block in the blockchain may be referred to as a genesis block, which includes information about the blockchain, its members, the data stored therein, etc.

The ordering service 1110 may be made up of a cluster of ordering nodes. The ordering service 1110 in some embodiments may not process transactions, smart contracts, or maintain the shared ledger. Rather, the ordering service 1110 in these embodiments may accept the endorsed transactions and specify the order in which those transactions are committed to the distributed ledger 1120. The architecture of the blockchain network may be designed such that the specific implementation of "ordering" (e.g., Solo, Kafka, BFT, etc.) becomes a pluggable component.

Transactions in some embodiments may be written to the distributed ledger 1120 in a consistent order. The order of transactions in these embodiments may be established to ensure that the updates to the state database 1124 are valid when they are committed to the network. Unlike a cryptocurrency blockchain system (e.g., Bitcoin, etc.), where ordering occurs through the solving of a cryptographic puzzle, or mining, in this example the parties of the distributed ledger 1120 may choose the ordering mechanism that best suits that network.

In some embodiments, when the ordering service 1110 initializes a new data block 1130, the new data block 1130 may be broadcast to committing peers (e.g., blockchain nodes 1111, 1112, and 1113). In response, each committing peer may validate the transaction within the new data block 1130 by checking to make sure that the read set and the write set still match the current world state in the state database 1124. Specifically, the committing peer may determine whether the read data that existed when the endorsers simulated the transaction is identical to the current world state in the state database 1124. When the committing peer validates the transaction, the transaction may be written to the blockchain 1122 on the distributed ledger 1120, and the state database 1124 may be updated with the write data from the read-write set. In some embodiments, if a transaction fails (e.g., if the committing peer finds that the read-write set does not match the current world state in the state database 1124), the transaction ordered into a block may still be included in that block, but marked as invalid, and the state database 1124 not updated.

Referring to FIG. 11B, a new data block 1130 (also referred to as a data block) that is stored on the blockchain 1122 of the distributed ledger 1120 may include multiple data segments in some embodiments, such as a block header 1140, block data 1150, and block metadata 1160. It should be appreciated that the various depicted blocks and their contents, such as new data block 1130 and its contents, shown in FIG. 11B are merely examples and are not meant to limit the scope of the example embodiments. The new data block 1130 may store transactional information of N transaction(s) (e.g., 1, 10, 100, 200, 1000, 2000, 3000, etc.) within the block data 1150. The new data block 1130 may also include a link to a previous block (e.g., on the blockchain 1122 in FIG. 11A) within the block header 1140. In particular, the block header 1140 may include a hash of a previous block's header. The block header 1140 may also include a unique block number, a hash of the block data 1150 of the new data block 1130, and the like. The block number of the new data block 1130 may be unique and assigned in various orders, such as an incremental/sequential order starting from zero.

The block data 1150 may store transactional information of each transaction that is recorded within the new data block 1130. For example, the transaction data may include one or more of: a type of the transaction, a version, a time-stamp, a channel ID of the distributed ledger 1120, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, name-space, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 1150 may also store new data 1162, which adds additional information to the hash-linked chain of blocks in the blockchain 1122. The additional information may include one or more of the steps, features, processes and/or actions described or depicted herein. Accordingly, the new data 1162 may be stored in an immutable log of blocks on the distributed ledger 1120. Some of the benefits of storing such new data 1162 are reflected in the various embodiments disclosed and depicted herein. Although in FIG. 11B the new data 1162 is depicted in the block data 1150, it could also be located in the block header 1140 or the block metadata 1160 in some embodiments. The new data 1162 may also include a document composite key that is used for linking the documents within an organization.

The block metadata 1160 may store multiple fields of metadata (e.g., as a byte array, etc.). Metadata fields may include: signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 1110. Meanwhile, a committer of the block (such as blockchain node 1112) may add validity/invalidity information based on an endorsement policy, verification of read/write sets, and the like. The transaction filter may include a byte array of a size equal to the number of transactions in the block data 1150 and a validation code identifying whether a transaction was valid/invalid.

Figure 11C:
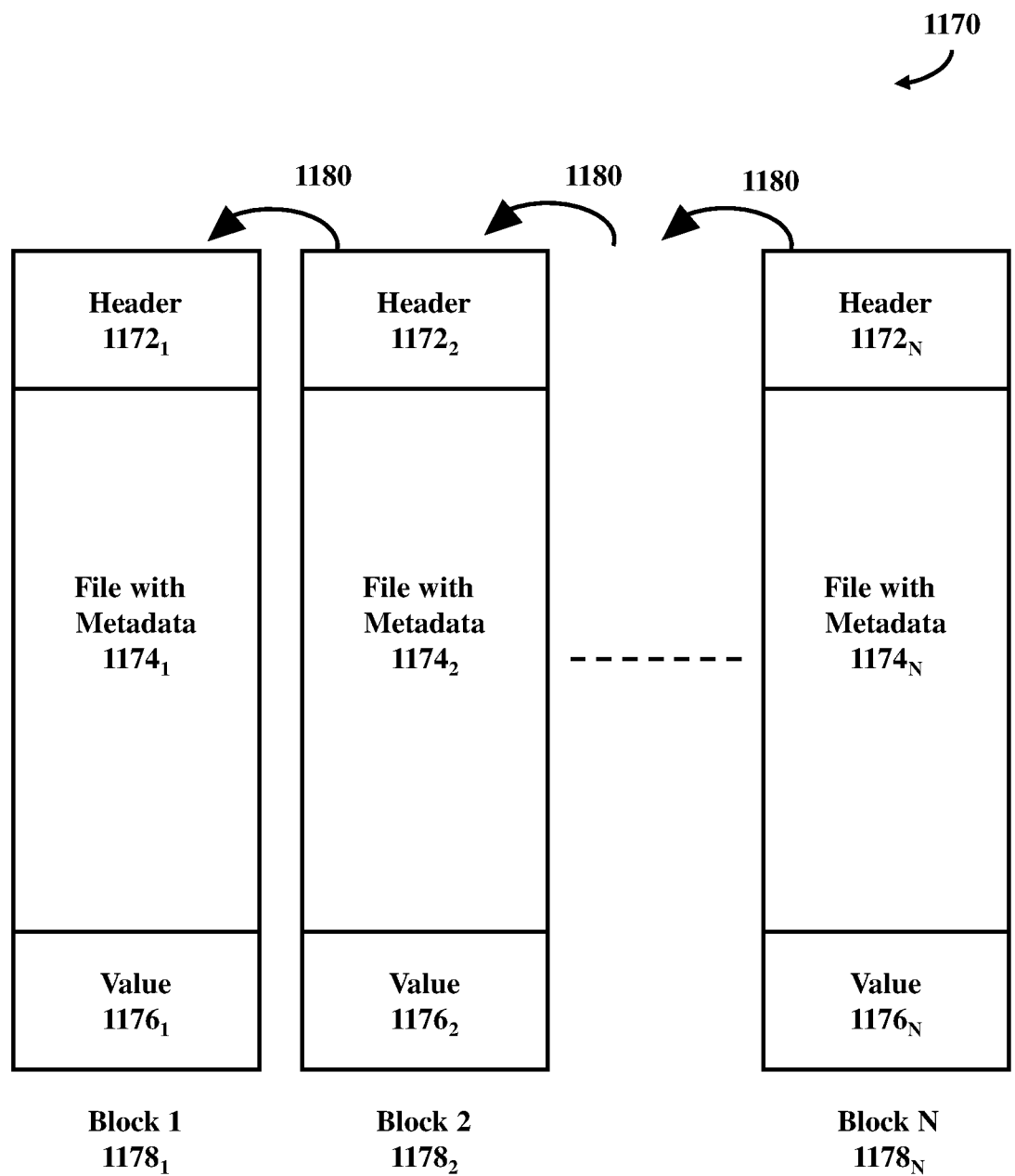
FIG. 11C illustrates a blockchain for digital content, according to example embodiments.

FIG. 11C illustrates an embodiment of a blockchain 1170 for digital content, consistent with some embodiments. The digital content may include one or more files and associated information. The files may include transaction data, media, images, video, audio, text, links, graphics, animations, web pages, documents, or other forms of digital content. The immutable, append-only aspects of some blockchain embodiments may be desirable to serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain in these embodiments may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may not be included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| . | . |
| . | . |
| . | . |
| Block N Hash Value | Block N Hash Value . . . Content |

In the example embodiment of FIG. 7C, the blockchain 1170 includes a number of blocks $1178_1$, $1178_2$, . . . $1178_N$ cryptographically linked in an ordered sequence, where N≥1. The encryption used to link the blocks $1178_1$, $1178_2$, . . . $1178_N$ may be any of a number of keyed or un-keyed Hash functions. In one embodiment, the blocks $1178_1$, $1178_2$, . . . $1178_N$ are subject to a hash function that produces n-bit alphanumeric outputs (where n is 256 or another number) from inputs that are based on information in the blocks. Examples of such a hash function include, but are not limited to: an SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $1178_1$, $1178_2$, . . . , $1178_N$ may be cryptographically linked by a function that is different from a hash function. For purposes of illustration, the following description is made with reference to a hash function, e.g., SHA-2.

Each of the blocks $1178_1$, $1178_2$, . . . , $1178_N$ in the blockchain may include a header, a version of the file, and a value. The header and the value may be different for each block as a result of hashing in the blockchain. In one embodiment, the value may be included in the header. As described in greater detail below, the version of the file may be the original file or may be a different version of the original file.

The first block $1178_1$ in the blockchain is referred to as the genesis block and may include the header $1172_1$, original file $1174_1$, and an initial value $1176_1$. The hashing scheme used for the genesis block, and indeed in all subsequent blocks, may vary. For example, all the information in the first block $1178_1$ may be hashed together and at one time, or each or a portion of the information in the first block $1178_1$ may be separately hashed, and then a hash of the separately hashed portions may be performed.

The header $1172_1$ may include one or more initial parameters, which, for example, may include a version number, time-stamp, nonce, root information, difficulty level, consensus protocol, duration, media format, source, descriptive keywords, and/or other information associated with original file $1174_1$ and/or the blockchain. The header $1172_1$ may be generated automatically (e.g., by blockchain network managing software) or manually by a blockchain participant. Unlike the header in other blocks $1178_2$ to $1178_N$ in the blockchain, the header $1172_1$ in the genesis block may not reference a previous block, simply because there is no previous block.

The original file $1174_1$ in the genesis block may be, for example, data as captured by a device with or without processing prior to its inclusion in the blockchain. The original file $1174_1$ may be received through the interface of the system from the device, media source, or node. The original file $1174_1$ may be associated with metadata, which, for example, may be generated by a user, the device, and/or the system processor, either manually or automatically. The metadata may be included in the first block $1178_1$ in association with the original file $1174_1$.

The value $1176_1$ in the genesis block may be an initial value generated based on one or more unique attributes of the original file $1174_1$. In one embodiment, the one or more unique attributes may include the hash value for the original file $1174_1$, metadata for the original file $1174_1$, and other information associated with the file. In one implementation, the initial value $1176_1$ may be based on the following unique attributes:
1) SHA-2 computed hash value for the original file
2) originating device ID
3) starting time-stamp for the original file
4) initial storage location of the original file
5) blockchain network member ID for software to currently control the original file and associated metadata The other blocks $1178_2$ to $1178_N$ in the blockchain also have headers, files, and values. However, unlike the header $1172_1$ of the first block, each of the headers $1172_2$ to $1172_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows $1180$, to establish an audit-able and immutable chain-of-custody.

Each of the header $1172_2$ to $1172_N$ in the other blocks may also include other information, e.g., version number, time-stamp, nonce, root information, difficulty level, consensus protocol, and/or other parameters or information associated with the corresponding files and/or the blockchain in general.

The files $1174_2$ to $1174_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing, which involves analyzing a file, may include, for example, appending, including, or otherwise associating various analytics, statistics, or other information associated with the file.

The values in each of the other blocks $1176_2$ to $1176_N$ in the other blocks are unique values and are all different as a result of the processing performed. For example, the value in any one block corresponds to an updated version of the value in the previous block. The update is reflected in the hash of the block to which the value is assigned. The values of the blocks, therefore, provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block, including the redacted file, will include metadata associated with the redacted file, e.g., how the redaction was performed, who performed the redaction, time-stamps where the redaction(s) occurred, etc. The metadata may be hashed to form the value. Because the metadata for the block is different from the information that was hashed to form the value in the previous block, the values are different from one another and may be recovered when decrypted.

Figure 11D:
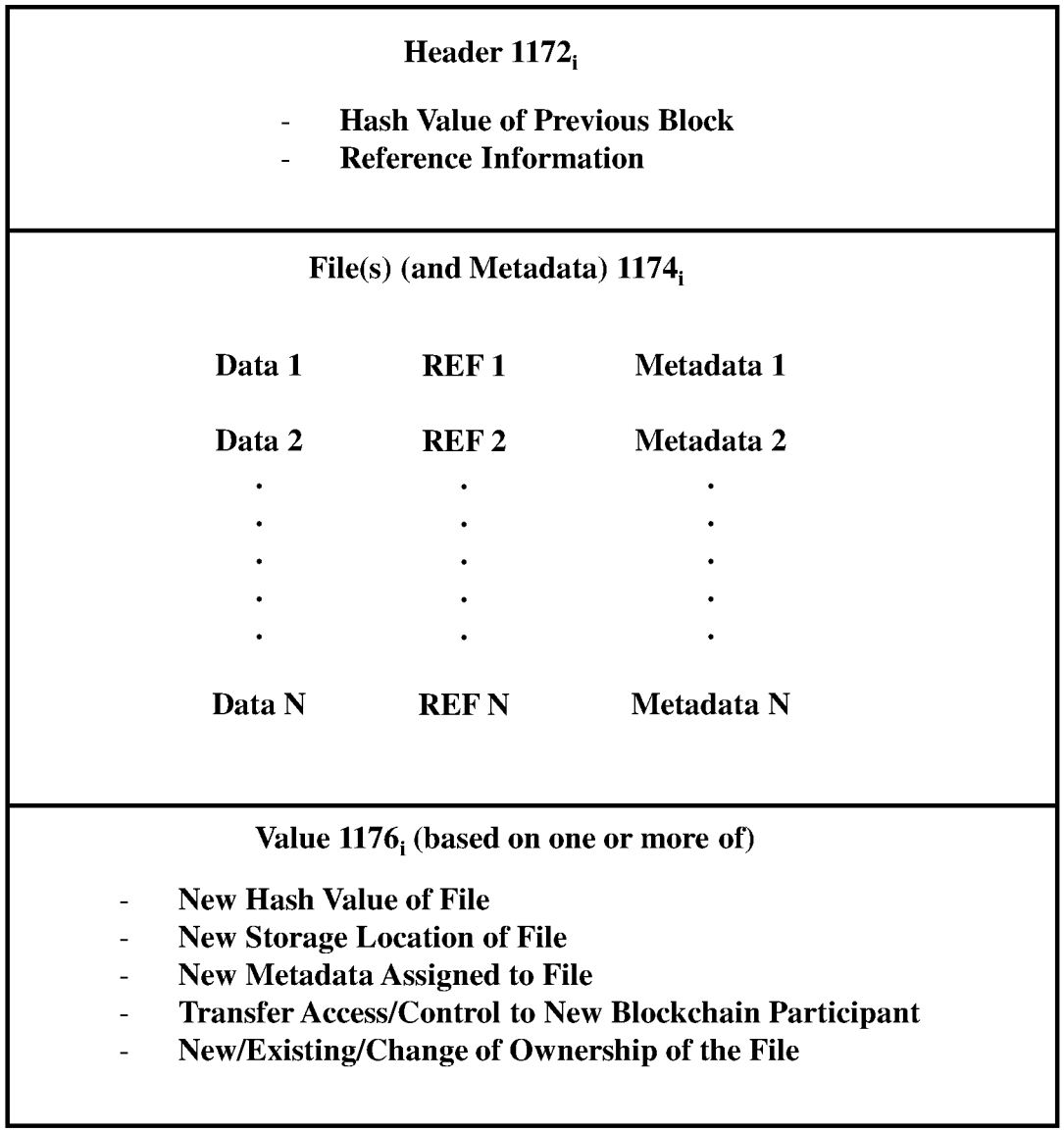
FIG. 11D illustrates a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.
a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 11D illustrates an embodiment of a block, which may represent the structure of the blocks in the blockchain $1190$, consistent with some embodiments. The block, $Block_i$, may include a header $1172_i$, a file $1174_i$, and a value $1176_i$.

The header $1172i$ may include a hash value of a previous block $Block_{i-1}$, and additional reference information, which, for example, may be any of the types of information (e.g., header information including references, characteristics, parameters, etc.) discussed herein. All blocks in some embodiments may reference the hash of a previous block except the genesis block in some embodiments. The hash value of the previous block may be just a hash of the header in the previous block or a hash of all or a portion of the information in the previous block, including the file and metadata.

The file $1174_i$ may include a plurality of data, such as Data 1, Data 2, . . . , Data N in sequence. The data are tagged with Metadata 1, Metadata 2, . . . , Metadata N, which describe the content and/or characteristics associated with the data. For example, the metadata for each data may include: information to indicate a time-stamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference REF1, REF2, . . . , $REF_N$ to a previous data to prevent tampering, gaps in the file, and sequential reference through the file.

Once the metadata is assigned to the data (e.g., through a smart contract), the metadata cannot be altered without the hash changing in some embodiments, which can easily be identified for invalidation. The metadata in these embodiments, thus, creates a data log of information that may be accessed for use by participants in the blockchain.

The value $1176_i$ in some embodiments may be a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 1170 is formed, at any point in time, the immutable chain-of-custody for the file may be obtained by querying the blockchain for the transaction history of the values across the blocks in some embodiments. This query, or tracking procedure, may begin with decrypting the value of the block that is most currently included (e.g., the last (Nth) block), and then continuing to decrypt the value of the other blocks until the genesis block is reached and the original file is recovered. The decryption may involve decrypting the headers and files and associated metadata at each block, as well.

Decryption may be performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key may be associated with each other through some mathematical relationship. The public key may be distributed publicly to serve as an address to receive messages from other users, e.g., an IP address or home address. The private key may be kept secret and may be used to digitally sign messages sent to other blockchain participants. The signature, in turn, may be included in the message so that the recipient can verify using the public key of the sender. This way, the recipient can be confident that only the sender could have sent this message.

In some embodiments, generating a key pair may be analogous to creating an account on the blockchain, but without having to actually register anywhere. In these embodiments, every transaction that is executed on the blockchain may be digitally signed by the sender using their private key. This signature may help ensure that only the owner of the account can track and process (if within the scope of permission determined by a smart contract) the file of the blockchain.

Figure 12A:
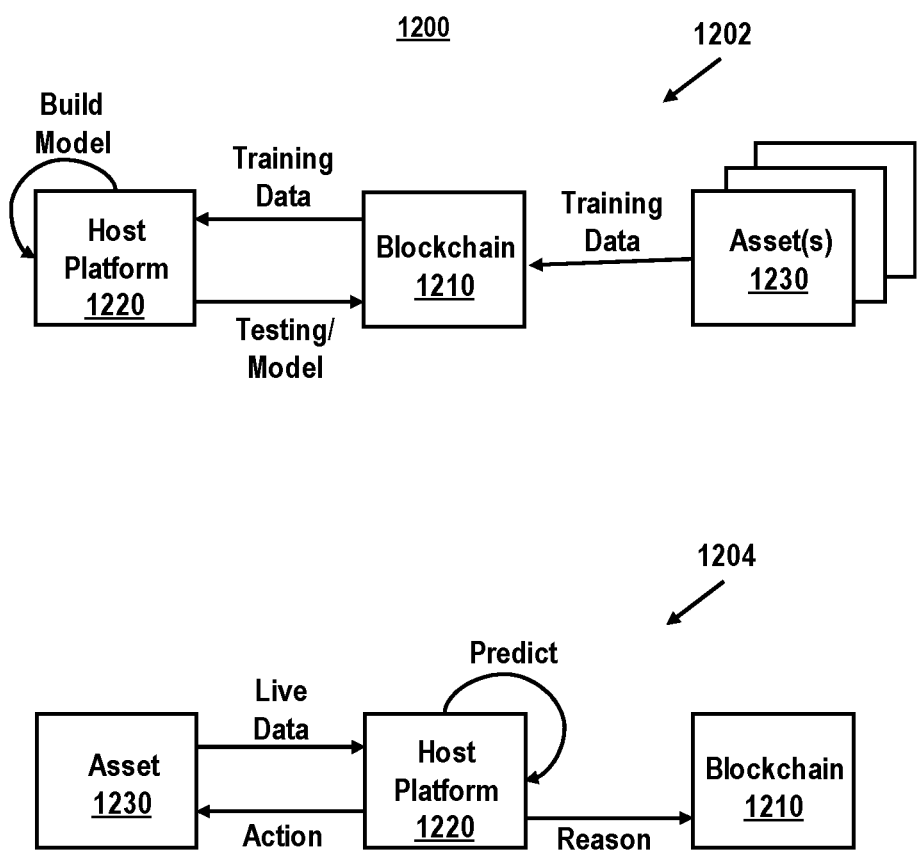
FIG. 12A illustrates an example blockchain which stores machine learning (artificial intelligence) data, according to example embodiments.
Figure 12B:
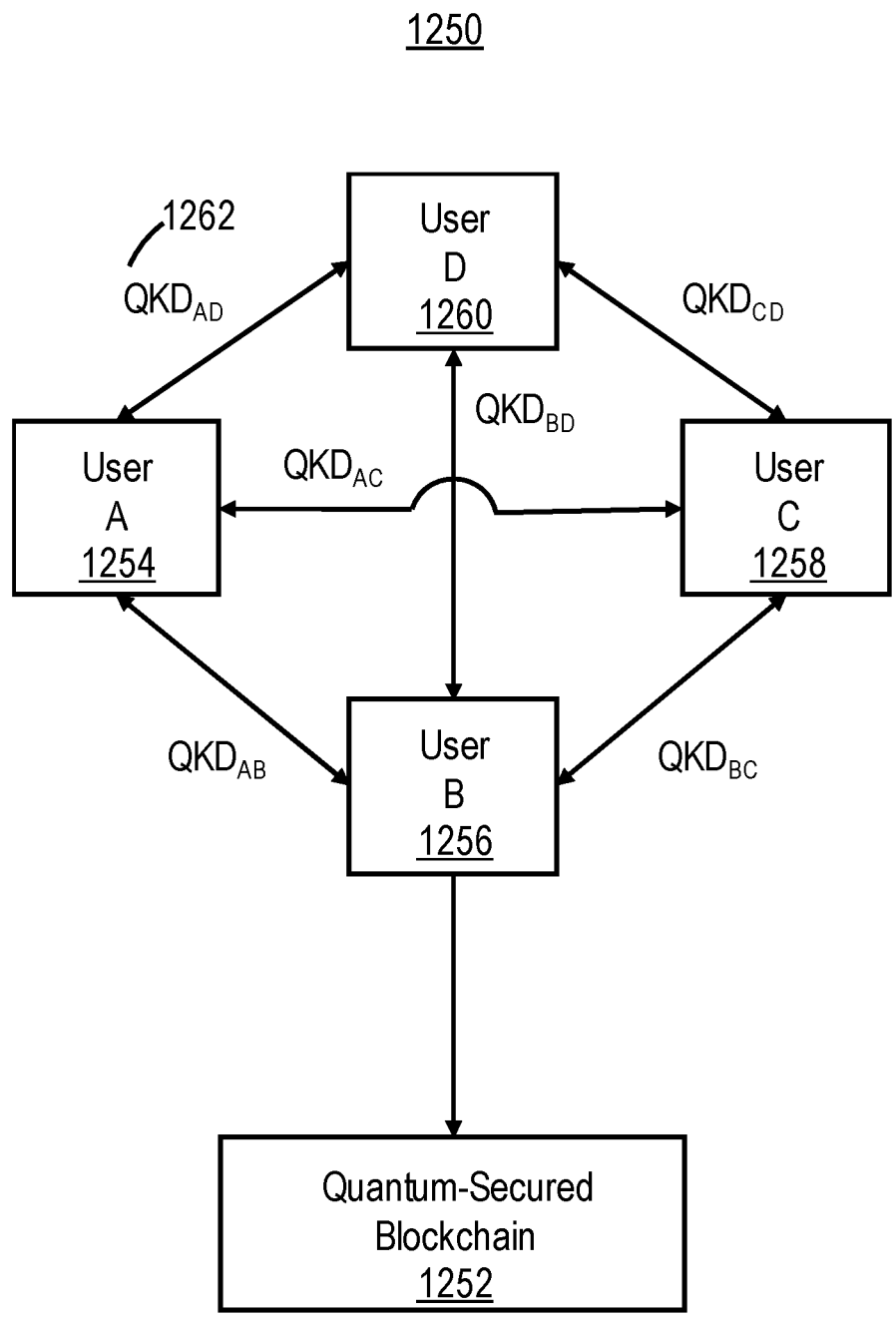
FIG. 12B illustrates an example quantum-secure blockchain, according to example embodiments.

FIGS. 12A and 12B illustrate additional examples of use cases for blockchain that may be incorporated and used herein. In particular, FIG. 12A illustrates an example 1200 of a blockchain 1210 that stores machine learning (artificial intelligence) data. Machine learning typically relies on vast quantities of historical data (or training data) to build predictive models for accurate prediction on new data. Machine learning software (e.g., neural networks, etc.) can often sift through millions of records to unearth non-intuitive patterns.

In the example of FIG. 12A, a host platform 1220 builds and deploys a machine learning model for predictive monitoring of assets 1230. Here, the host platform 1220 may be a cloud platform, an industrial server, a web server, a personal computer, a user device, and the like. Assets 1230 can be any type of asset (e.g., machine or equipment, etc.) such as an aircraft, locomotive, turbine, medical machinery and equipment, oil and gas equipment, boats, ships, vehicles, and the like. As another example, assets 1230 may be non-tangible assets such as stocks, currency, digital coins, insurance, or the like.

The blockchain 1210 may be used to significantly improve both a training process 1202 of the machine learning model and a predictive process 1204 based on a trained machine learning model. For example, in 1202, rather than requiring a data scientist/engineer or other user to collect the data, historical data may be stored by the assets 1230 themselves (or through an intermediary, not shown) on the blockchain 1210. This may significantly reduce the collection time needed by the host platform 1220 when performing predictive model training. For example, using smart contracts, data can be directly and reliably transferred straight from its place of origin to the blockchain 1210. By using the blockchain 1210 to ensure the security and ownership of the collected data, smart contracts may directly send the data from the assets to the individuals that use the data for building a machine learning model. This allows for sharing of data among the assets 1230.

The collected data may be stored in the blockchain 1210 based on a consensus mechanism. The consensus mechanism may pull in (permissioned nodes) to ensure that the data being recorded is verified and accurate. The data recorded may be time-stamped, cryptographically signed, and immutable. It is therefore auditable, transparent, and secure. Adding IoT devices, which write directly to the blockchain, can in certain cases (i.e. supply chain, healthcare, logistics, etc.), increase both the frequency and accuracy of the data being recorded.

Furthermore, training of the machine learning model on the collected data may take rounds of refinement and testing by the host platform 1220. Each round may be based on additional data or data that was not previously considered to help expand the knowledge of the machine learning model. In 1202, the different training and testing steps (and the data associated therewith) may be stored on the blockchain 1210 by the host platform 1220. Each refinement of the machine learning model (e.g., changes in variables, weights, etc.) may be stored on the blockchain 1210. This provides verifiable proof of how the model was trained and what data was used to train the model. Furthermore, when the host platform 1220 has achieved a finally trained model, the resulting model may be stored on the blockchain 1210.

After the model has been trained, it may be deployed to a live environment where it can make predictions/decisions based on the execution of the final trained machine learning model. For example, in 1204, the machine learning model may be used for condition-based maintenance (CBM) for an asset such as an aircraft, a wind turbine, a healthcare machine, and the like. In this example, data fed back from the asset 1230 may be input the machine learning model and used to make event predictions such as failure events, error codes, and the like. Determinations made by the execution of the machine learning model at the host platform 1220 may be stored on the blockchain 1210 to provide auditable/verifiable proof. As one non-limiting example, the machine learning model may predict a future breakdown/failure to a part of the asset 1230 and create alert or a notification to replace the part. The data behind this decision may be stored by the host platform 1220 on the blockchain 1210. In one embodiment the features and/or the actions described and/or depicted herein can occur on or with respect to the blockchain 1210.

New transactions for a blockchain may be gathered together into a new block and added to an existing hash value. This may then be encrypted to create a new hash for the new block. This may be added to the next list of transactions when they are encrypted, and so on. The result is a chain of blocks that each contain the hash values of all preceding blocks. Computers that store these blocks regularly compare their hash values to ensure that they are all in agreement. Any computer that does not agree, discards the records that are causing the problem. This approach is good for ensuring tamper-resistance of the blockchain, but it is not perfect.

One way to game this system is for a dishonest user to change the list of transactions in their favor, but in a way that leaves the hash unchanged. This can be done by brute force, in other words by changing a record, encrypting the result, and seeing whether the hash value is the same. And if not, trying again and again and again until it finds a hash that matches. The security of blockchains is based on the belief that ordinary computers can only perform this kind of brute force attack over time scales that are entirely impractical, such as the age of the universe. By contrast, quantum computers are much faster (1000s of times faster) for some types of problems, and consequently, pose a much greater threat.

FIG. 12B illustrates an example 1250 of a quantum-secure blockchain 1252, which implements quantum key distribution (QKD) to protect against a quantum computing attack. In this example, blockchain users can verify each other's identities using QKD. This may send information using quantum particles such as photons, which cannot be copied by an eavesdropper without destroying them. In this way, a sender and a receiver through the blockchain can be sure of each other's identity.

In the example of FIG. 12B, four users are present 1254, 1256, 1258, and 1260. Each of pair of users may share a secret key 1262 (i.e., a QKD) between themselves. Because there are four nodes in this example, six pairs of nodes exist, and therefore six different secret keys 1262 are used including $QKD_{AB}$, $QKD_{AC}$, $QKD_{BD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the blockchain 1252 may be based on two procedures (i) creation of transactions, and (ii) construction of blocks that aggregate the new transactions. New transactions may be created similar to a traditional blockchain network. Each transaction may contain information about a sender, a receiver, a time of creation, an amount (or value) to be transferred, a list of reference transactions that justifies the sender has funds for the operation, and the like.

This transaction record is then sent to all other nodes where it is entered into a pool of unconfirmed transactions. Here, two parties (i.e., a pair of users from among 1254-1260) may authenticate the transaction by providing their shared secret key 1262 (QKD). This quantum signature may be attached to every transaction, making it difficult to tamper with. Each node checks their entries with respect to a local copy of the blockchain 1252 to verify that each transaction has sufficient funds. However, the transactions are not yet confirmed.

Rather than perform a traditional mining process on the blocks, the blocks may be created in a decentralized manner using a broadcast protocol. At a predetermined period of time (e.g., seconds, minutes, hours, etc.) the network may apply the broadcast protocol to any unconfirmed transaction thereby to achieve a *Byzantine* agreement (consensus) regarding a correct version of the transaction. For example, each node may possess a private value (transaction data of that particular node). In a first round, nodes transmit their private values to each other. In subsequent rounds, nodes communicate the information they received in the previous round from other nodes. Here, honest nodes are able to create a complete set of transactions within a new block. This new block can be added to the blockchain 1252. In one embodiment the features and/or the actions described and/or depicted herein can occur on or with respect to the blockchain 1252.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

Aspects of the present invention were described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A computer-implemented method for establishing consensus in a blockchain network, comprising:
providing a first total ordering service gateway ("TOS gateway") for an organization in a blockchain network, wherein the TOS gateway has read/write access to a shared message queue that makes messages available to each other TOS gateway in the blockchain network, wherein contents of the messages are unreadable by an entity managing the shared message queue;
generating a symmetric key at the first TOS gateway;
splitting the symmetric key to generate a plurality of key shares;
distributing at least one of the plurality of key shares to a second TOS gateway in the blockchain network; and
receiving, at the first TOS gateway from the second TOS gateway via the shared queue, a request for the symmetric key; and in response:
receiving an ephemeral public counterpart from the second TOS gateway;
generating an ephemeral key pair, wherein the ephemeral key pair comprises an ephemeral private key and an ephemeral public counterpart for the first TOS gateway;
generating an ephemeral symmetric key;
encrypting the ephemeral symmetric key using the ephemeral public counterpart from the second TOS gateway;
encrypting a shared key using the ephemeral symmetric key; and
publishing the encrypted shared key to the shared queue.

2. The computer-implemented method of claim 1, wherein the symmetric key is only known to a plurality of TOS gateways in the blockchain network.

3. The computer-implemented method of claim 1, further comprising:
storing at least one of the plurality of key shares in persistent memory; and
storing the symmetric key only in volatile memory.

4. The computer-implemented method of claim 1, further comprising:
receiving a transaction payload at the first TOS gateway;
encrypting the transaction using the symmetric key; and
publishing the encrypted transaction to the shared message queue.

5. The computer-implemented method of claim 4, further comprising:
forming one or more blocks associated with the transaction; and
autonomously signing the one or more blocks with a blockchain key.

6. The computer-implemented method of claim 5, wherein the contents of the messages comprises the transaction payload.

7. The computer-implemented method of claim 5, further comprising appending the signed one or more blocks to a blockchain associated with the blockchain network.

8. The computer-implemented method of claim 1, further comprising recovering the symmetric key, comprising:
requesting one of the key shares from the second gateway in the blockchain network; and
reconstructing the symmetric key using the one of the key shares.

9. The computer-implemented method of claim 8, wherein requesting the one of the key shares from the second gateway comprises:
generating an ephemeral key pair at the first TOS gateway, wherein the ephemeral key pair comprises an ephemeral private key and ephemeral public counterpart;
publishing the ephemeral public counterpart to the shared queue;
receiving, from the second TOS gateway via the shared queue, an ephemeral symmetric key, wherein the ephemeral symmetric key is generated in part using the ephemeral public counterpart of the first TOS gateway;
receiving, from the second TOS gateway via the shared queue, the one of the key shares, wherein the one of the key shares is encrypted using the ephemeral symmetric key;
decrypting the one of the key shares using the ephemeral symmetric key; and
forgetting the ephemeral key pair.

10. The computer-implemented method of claim 9, wherein the second TOS gateway is a new TOS gateway in the blockchain network.

11. The computer-implemented method of claim 1, further comprising rotating the symmetric key, comprising:
receiving a channel reconfiguration message at the first TOS gateway;
generating an ephemeral key pair at the first TOS gateway, wherein the ephemeral key pair comprises an ephemeral private key and ephemeral public counterpart;
publishing the ephemeral public counterpart to the shared queue;
receiving a key split from the second TOS gateway via the shared queue, wherein the key split is encrypted using the ephemeral public counterpart; and
decrypting the key split using the ephemeral private key.

12. The computer-implemented method of claim 11, wherein the channel reconfiguration message is in response to a TOS gateway removal action.

13. A computer program product for a confidential ordering service, the computer program product comprising:
one or more computer readable storage media, and program instructions collectively stored on the one or more computer readable storage media, the program instructions comprising:
running a total ordering service gateway ("TOS gateway") for each organization in a blockchain network, wherein each total ordering service gateway has read/write access to a shared message queue that distributes messages to each organization, wherein each total ordering service gateway for each of the organizations in the group of organizations is aware of one or more certificates associated with other organizations in the group of organizations;
identifying a group of organizations within the organizations; and
generating a channel that includes the group of organizations, wherein the group of organizations cooperate autonomously;
wherein the plurality of TOS gateways contain program instructions to:
receive a transaction payload;
encrypt the transaction payload using the symmetric key; and
publish the encrypted transaction payload to the shared message queue.

14. The computer program product of claim 13, further comprising program instructions for:

generating a symmetric key only known to the group of organizations;

splitting the symmetric key into respective shares associated with a number of organizations in the group of organizations; and storing the shares while not storing the symmetric key as a whole.

15. The computer program product of claim 14, further comprising program instructions for:

receiving, by a total ordering service gateway of at least one organization in the group of organizations, a transaction;

encrypting the transaction with the symmetric key;

forming one or more blocks associated with the transaction;

signing the one or more blocks autonomously with the respective share; and broadcasting the signed one or more blocks to the group of organizations.

16. A total ordering service for a blockchain network, comprising:

a plurality of total ordering service gateways ("TOS gateways"), each associated with one of a plurality of member organizations in a blockchain network, wherein the plurality of TOS gateways each comprise a processor operably connected to a memory, the memory containing program instructions to, when executed on the processor:

generate a symmetric key at a first of the plurality of TOS gateways;

split the symmetric key into a plurality of key shares; and distribute at least one of the plurality of key shares to a second TOS gateway in the blockchain network;

a shared message queue adapted redistribute the symmetric key to the plurality of TOS gateways in the blockchain network;

wherein the plurality of TOS gateways further contain program instructions to:

receive a transaction payload;

encrypt the transaction payload using the symmetric key; and publish the encrypted transaction payload to the shared message queue; and wherein the shared message queue is further adapted redistribute transaction payload to the plurality of TOS gateways in the blockchain network without reading the message content.

17. The blockchain network of claim 16, wherein the plurality of TOS gateways further contain program instructions to:

store one of the key shares in persistent memory; and store the symmetric key only in volatile memory.

* * * * *